US007836760B2

(12) United States Patent
Saylor

(10) Patent No.: US 7,836,760 B2
(45) Date of Patent: Nov. 23, 2010

(54) METHOD AND DEVICE FOR THE ASSESSMENT OF FLUID COLLECTION NETWORKS

(76) Inventor: David J. Saylor, 810 N. Co. Rd. 330, Valparaiso, IN (US) 46385

(*) Notice: Subject to any disclaimer, the term of this patent is extended or adjusted under 35 U.S.C. 154(b) by 185 days.

(21) Appl. No.: 12/257,311

(22) Filed: Oct. 23, 2008

(65) Prior Publication Data

US 2009/0105969 A1 Apr. 23, 2009

Related U.S. Application Data

(60) Provisional application No. 61/000,050, filed on Oct. 23, 2007.

(51) Int. Cl.
*G01F 7/00* (2006.01)
*G01F 1/28* (2006.01)
(52) U.S. Cl. ..................... 73/195; 73/861.71
(58) Field of Classification Search ............. None
See application file for complete search history.

(56) References Cited

U.S. PATENT DOCUMENTS

| | | | |
|---|---|---|---|
| 2,580,782 A | 1/1952 | Hoffmann | 73/204.18 |
| 2,809,520 A | 10/1957 | Richard | 73/170.07 |
| 3,149,254 A | 9/1964 | Carter | 310/12 |
| 3,218,852 A | 11/1965 | Scarpa | 73/861.21 |
| 3,354,717 A | 11/1967 | Minnic | 73/204.22 |
| 3,638,490 A | 2/1972 | Buettner | 73/861.65 |
| 3,948,098 A | 4/1976 | Richardson | 73/861.24 |
| 3,995,373 A * | 12/1976 | Brumbelow | 33/783 |
| 4,011,756 A | 3/1977 | Lemos | 73/204.27 |
| 4,034,607 A | 7/1977 | Martig | 73/215 |
| 4,070,563 A | 1/1978 | Petroff | 702/47 |
| 4,079,362 A | 3/1978 | Grimm | 340/684 |
| 4,083,246 A | 4/1978 | Marsh | 73/227 |
| 4,100,798 A | 7/1978 | Nilsson | 73/861.52 |
| 4,116,061 A | 9/1978 | Petroff | 73/299 |
| 4,125,020 A | 11/1978 | Mcclure | 73/215 |
| 4,127,032 A | 11/1978 | Martig | 73/215 |
| 4,152,933 A | 5/1979 | Woodhouse | 73/170.07 |
| 4,195,521 A | 4/1980 | Fitzgerald | 73/227 |
| 4,211,111 A | 7/1980 | Petroff | 73/195 |
| 4,295,197 A | 10/1981 | Petroff | 702/45 |
| 4,301,809 A | 11/1981 | Pinchak | 600/508 |
| 4,344,329 A | 8/1982 | Petroff | 73/861 |
| 4,402,213 A * | 9/1983 | Hogan | 73/40.5 R |
| 4,407,158 A | 10/1983 | Petroff | 73/196 |
| 4,414,848 A | 11/1983 | Shutt | 73/497 |

(Continued)

*Primary Examiner*—Harshad Patel
(74) *Attorney, Agent, or Firm*—Dowell Baker, P.C.

(57) ABSTRACT

The improved monitoring device includes a data acquisition device with an accelerometer inside a bendable tube. One end of the tube is connected to a pole that may be secured to the top of a sewer manhole, while the other end is submerged in a fluid flow. The tilt, oscillations, and pressure exerted upon the tube due to fluid flow are measured and recorded. An improved method includes installing several monitoring devices into sewer system manholes, recording fluid level and flow, reading the recorded data, and displaying the data in chart or map form. Data may be displayed in two or three dimensional maps that may be overlaid with information of topography, street maps, and single or multiple sewer systems. Data displayed on the maps may include fluid flow rates, fluid levels, derivatives and integrals of flow rates, and differences in fluid levels or flow between monitoring devices.

24 Claims, 37 Drawing Sheets

U.S. PATENT DOCUMENTS

| | | | | |
|---|---|---|---|---|
| 4,467,644 A | 8/1984 | Palmer | ........................ | 73/198 |
| 4,571,997 A * | 2/1986 | Kepple et al. | ................. | 73/215 |
| 4,630,474 A | 12/1986 | Petroff | ........................ | 73/196 |
| 4,651,139 A | 3/1987 | Oettli | ........................ | 340/531 |
| 4,846,191 A | 7/1989 | Brockway | ................... | 600/561 |
| 4,919,564 A | 4/1990 | Neathery | ................... | 404/25 |
| 5,091,863 A | 2/1992 | Hungerford | ................. | 700/283 |
| 5,143,478 A | 9/1992 | Bowman | ................... | 404/26 |
| 5,198,989 A | 3/1993 | Petroff | ........................ | 702/48 |
| 5,230,331 A | 7/1993 | Rusz | ........................ | 128/205.23 |
| 5,299,141 A | 3/1994 | Hungerford | ................. | 702/49 |
| 5,329,464 A | 7/1994 | Sumic | ........................ | 703/1 |
| 5,385,049 A | 1/1995 | Hunt | ........................ | 73/592 |
| 5,385,371 A | 1/1995 | Izawa | ........................ | 283/34 |
| 5,461,708 A | 10/1995 | Kahn | ........................ | 345/440 |
| 5,506,791 A | 4/1996 | Hungerford | ................. | 702/50 |
| 5,556,282 A | 9/1996 | Middlebrook | ............... | 434/178 |
| 5,608,171 A | 3/1997 | Hunter | ................... | 73/861.63 |
| 5,622,173 A | 4/1997 | Bisson | ........................ | 600/459 |
| RE35,503 E | 5/1997 | Hunter | ................... | 73/861.63 |
| 5,631,970 A | 5/1997 | Hsu | ........................ | 382/113 |
| 5,684,250 A | 11/1997 | Marsh | ........................ | 73/227 |
| 5,739,420 A | 4/1998 | Peterson | ................... | 73/40.5 R |
| 5,747,692 A | 5/1998 | Jacobsen | ................... | 73/514.25 |
| 5,808,916 A | 9/1998 | Orr | ........................ | 703/6 |
| 5,811,688 A | 9/1998 | Marsh | ................... | 73/861.25 |
| 5,812,962 A | 9/1998 | Kovac | ........................ | 701/208 |
| 5,821,427 A | 10/1998 | Byrd | ........................ | 73/861.25 |
| 5,852,240 A | 12/1998 | Leblanc | ........................ | 73/215 |
| RE36,069 E | 2/1999 | Hunter | ........................ | 73/215 |
| 5,942,698 A | 8/1999 | Stevens | ................... | 73/863.03 |
| 6,085,586 A | 7/2000 | Arvidson | ................... | 73/201 |
| 6,201,554 B1 | 3/2001 | Lands | ........................ | 345/169 |
| 6,241,028 B1 | 6/2001 | Bijleveld | ..................... | 175/40 |
| 6,256,649 B1 | 7/2001 | Mackinlay | ................... | 715/212 |
| 6,263,747 B1 * | 7/2001 | Carson et al. | ............... | 73/866.5 |
| 6,356,052 B2 | 3/2002 | Koike | ........................ | 320/108 |
| 6,522,972 B2 | 2/2003 | Helms | ........................ | 702/3 |
| 6,573,721 B1 | 6/2003 | Cull | ........................ | 324/336 |
| 6,641,482 B2 | 11/2003 | Masuyama | ................... | 463/44 |
| 6,701,261 B2 | 3/2004 | Schutzbach | ................. | 702/50 |
| 6,747,650 B2 | 6/2004 | Turner | ........................ | 345/473 |
| 6,757,623 B2 | 6/2004 | Schutzbach | ................. | 702/45 |
| 6,807,494 B2 | 10/2004 | Schutzbach | ................. | 702/45 |
| 6,832,166 B2 | 12/2004 | Schutzbach | ................. | 702/50 |
| 6,904,361 B1 | 6/2005 | Tallman | ........................ | 701/208 |
| 6,924,645 B2 | 8/2005 | Mercer | ........................ | 324/326 |
| 6,955,498 B1 | 10/2005 | Mccuan | ........................ | 404/25 |
| 6,987,877 B2 | 1/2006 | Paz-pujalt | ................... | 382/152 |
| 7,010,759 B2 | 3/2006 | Janu | ........................ | 715/848 |
| 7,096,128 B2 | 8/2006 | Saylor | ........................ | 702/45 |
| 7,131,791 B2 * | 11/2006 | Whittaker et al. | ......... | 405/184.2 |
| 7,249,030 B2 | 7/2007 | Sopko | ........................ | 705/1 |
| 7,322,252 B1 * | 1/2008 | Rodgers | ................... | 73/862.08 |
| 7,703,343 B1 * | 4/2010 | Rodgers | ................... | 73/862.08 |
| 2002/0156590 A1 | 10/2002 | Schutzbach | ................. | 702/45 |
| 2002/0170350 A1 | 11/2002 | Schutzbach | ................. | 73/195 |
| 2002/0173923 A1 | 11/2002 | Schutzbach | ................. | 702/45 |
| 2002/0184235 A1 | 12/2002 | Young | ........................ | 707/104.1 |
| 2003/0128865 A1 | 7/2003 | White | ........................ | 382/113 |
| 2003/0236639 A1 | 12/2003 | Curry | ........................ | 702/45 |
| 2004/0075697 A1 | 4/2004 | Maudlin | ........................ | 715/848 |
| 2004/0138816 A1 | 7/2004 | Schutzbach | ................. | 702/3 |
| 2005/0005467 A1 * | 1/2005 | Hannel | ........................ | 33/542 |
| 2005/0037023 A1 | 2/2005 | Field | ........................ | 424/195.15 |
| 2006/0283238 A1 | 12/2006 | Sierra | ........................ | 73/61.41 |
| 2006/0289064 A1 * | 12/2006 | Gill | ........................ | 137/315.01 |

\* cited by examiner

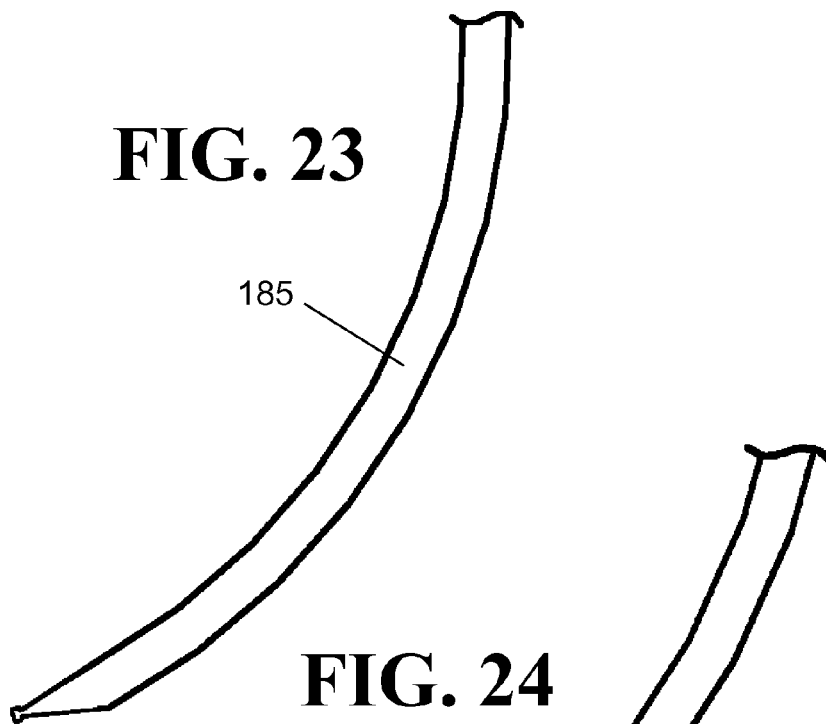
FIG. 23
FIG. 24
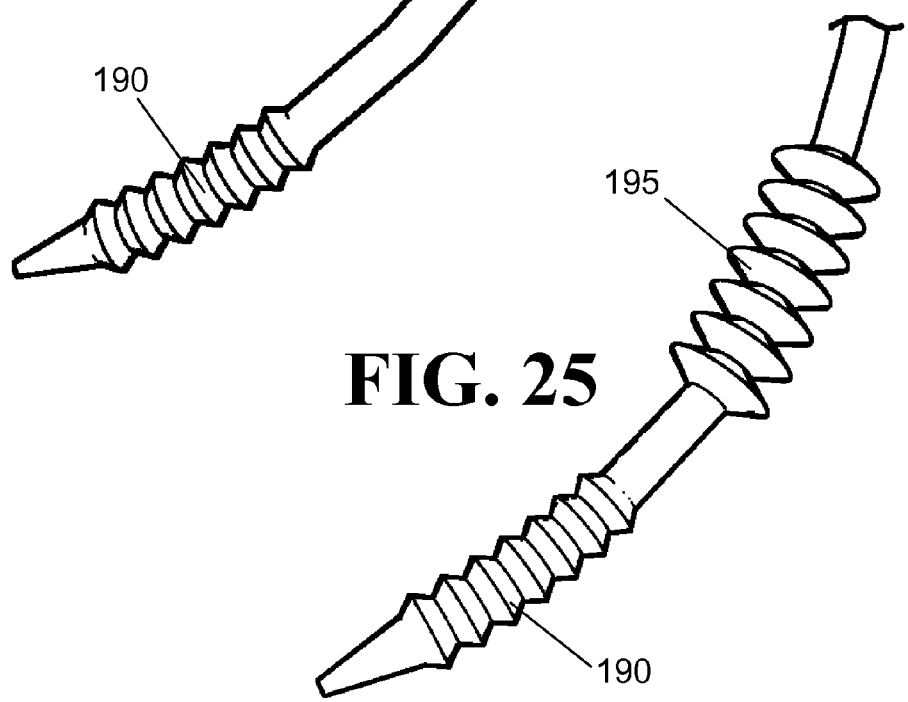
FIG. 25

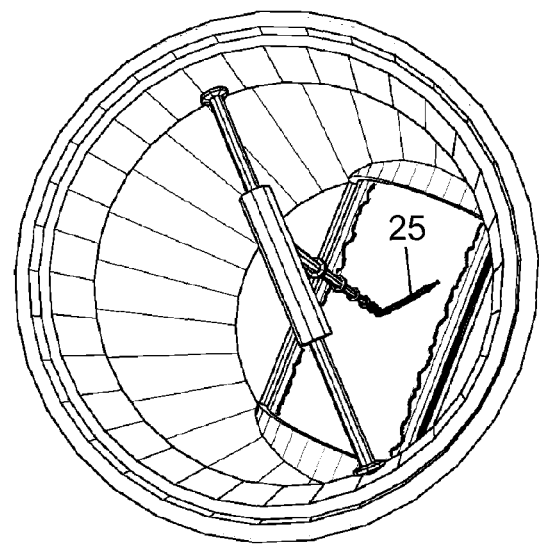
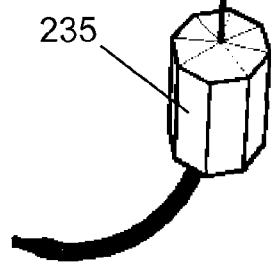
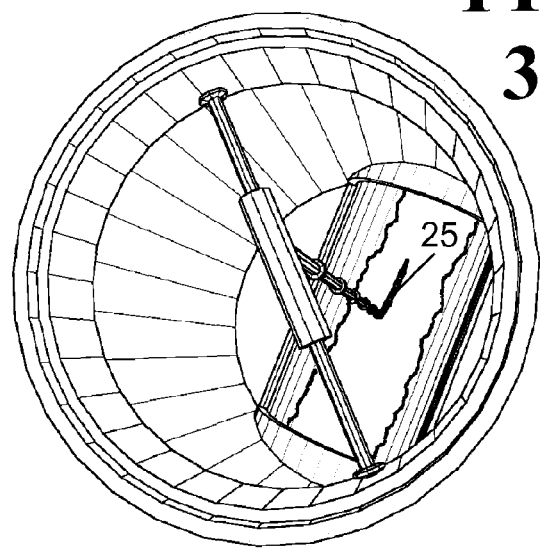
FIG. 36
FIG. 37
FIG. 38

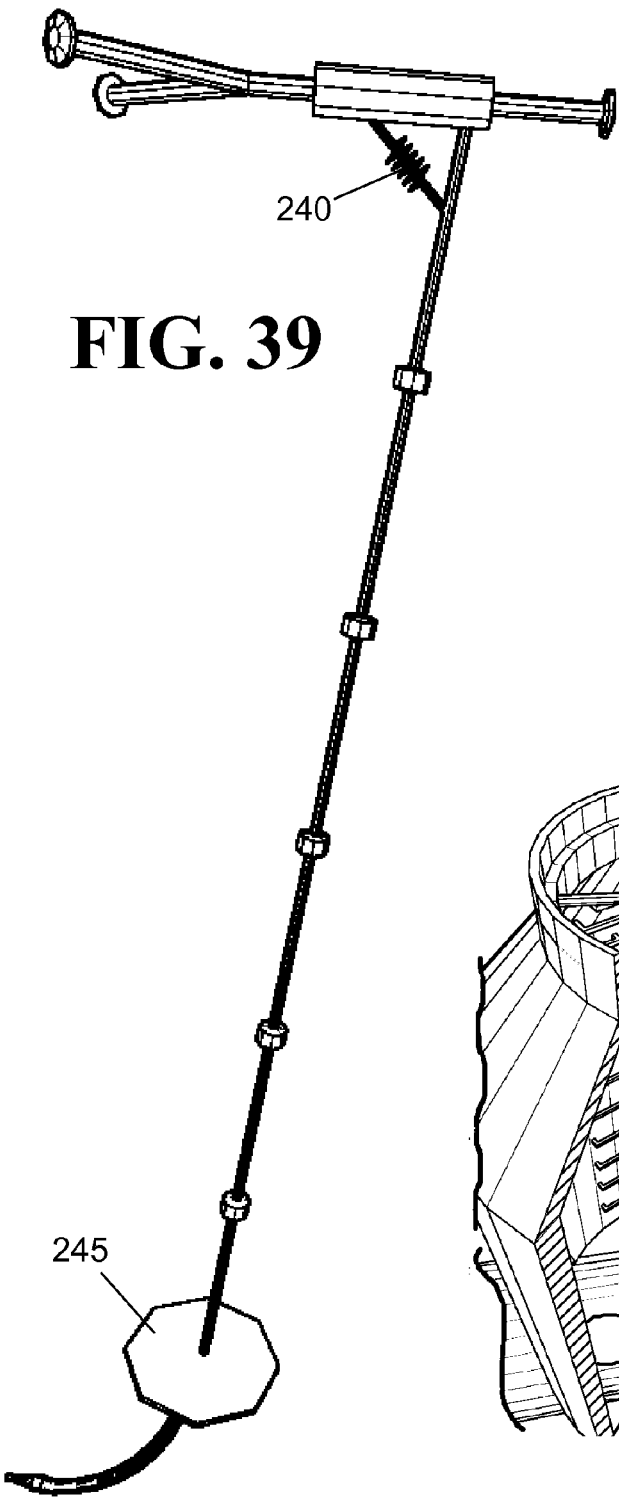

FIG. 67
FIG. 68

METHOD AND DEVICE FOR THE ASSESSMENT OF FLUID COLLECTION NETWORKS

CROSS-REFERENCE TO COPENDING APPLICATION

This application claims the benefit of U.S. Provisional Patent Application Ser. No. 61/000,050, entitled "Method and Device for the Assessment of Fluid Collection Networks" filed Oct. 23, 2007, which is incorporated herein by reference in its entirety.

FIELD OF THE INVENTION

The present invention relates generally to a device and method for testing flow rates in a liquid system, and more particularly to a device and method for continuously monitoring flow rates in a sewer system.

BACKGROUND OF THE INVENTION

To prevent water pollution in furtherance of the goals of the Clean Water Act, regulations and enforcement actions have historically focused on the output of wastewater treatment facilities. However, in recent years, the technology for treating wastewater has largely matured to the point that treatment facilities are decreasingly the source of significant water pollution. To further eliminate potential water pollution, the United States Environmental Protection Agency, municipalities, and sanitary sewer system authorities have recently refocused their attention and resources on the networks of pipes that transport wastewater to the treatment facility.

These piping networks may be constructed as a combined wastewater and storm water system, or be dedicated exclusively to the transport of wastewater. In either case, untreated wastewater can overflow from the system into the environment. For the health of the community and environment, and to remain in compliance with the law, a sanitary sewer system authority must prevent such overflows. To comply with a permit to operate a sanitary sewer system, a sewer authority must "take all reasonable steps to minimize or prevent any discharge . . . which has a reasonable likelihood of adversely affecting human health or the environment." 40 CFR 122.41 (d).

A sanitary system overflow (SSO), can be caused by a number of factors. The primary causes are restrictions and blockages in the sewer system, most often caused by the accumulation of debris, roots and/or grease in a sewer pipe. In wet weather conditions, storm water runoff may overwhelm the capacity of a combined sanitary sewer and storm water system, and cause the system to overflow.

In the past, municipalities and sanitary system authorities have addressed actual and potential sanitary sewer system overflows in a number of ways. Many authorities have simply built additional or redundant capacity into their piping systems to prevent overflows. Studies have shown, however, that restrictions and blockages are the primary causes of overflows, not a lack of capacity in the system. Thus, simply adding additional capacity leads to piping systems that are underutilized and more expensive than necessary to serve the sanitary needs of the community.

The infiltration and inflow of storm water into a dedicated sanitary sewer system is a significant concern. During wet weather conditions, storm water runoff may infiltrate a dedicated sanitary sewer system. Even if the infiltration does not lead to a system overflow, infiltration and inflow of storm water into a sanitary sewer system leads to increased costs because the storm water inflow must then be treated along with the untreated sewage.

Restrictions, infiltrations and inflows lead to increased costs and potential environmental problems, and an SSO may result in untreated sewage being released into the environment or backing up into residential basements. To avoid these problems, municipalities and sanitary sewer system authorities attempt to identify potential points of restriction, infiltration, and inflow in a sanitary sewer system and address any problems causing the infiltration and inflow.

Storm water runoff may infiltrate a dedicated sanitary sewer system through broken or ruptured pipes. However, because these pipes are typically underground, the infiltration point is difficult if not impossible to locate and detect by visual inspection during a wet weather event. Although the location of an overflow may be obvious, the source of the extra water that is actually causing the overflow may be a mystery. Also, in most cases, the only evidence of infiltration is the increased burden on treatment facilities during a wet weather event.

To detect and identify infiltration points, municipalities and sanitary sewer system authorities typically monitor the flow in the system during a wet weather event. Flow measurements may be taken at a multitude of points in the system. These flow measurements may then be compared with flow measurements during dry weather to determine if the wet weather has increased flow at a particular point or points in the system. Such flow measurement studies, however, are difficult and expensive to administer, in addition to being difficult to schedule due to the unpredictability of the weather.

Some larger authorities have employed complex and expensive evaluation methods to identify potential causes of sewer infiltration and SSO's. These methods often include the use of expensive devices for monitoring flow at different points in the system and the employment of personnel and/or consultants to collect and analyze data from the flow monitoring devices. The data is often analyzed by consultants using proprietary software by paid consultants.

Many devices for measuring and monitoring fluid flow velocity have been developed. The velocity of some fluid flows may be measured by placing a paddle wheel or turbine in the flow and measuring the rate of spin of the device. Fluid flow velocity may also be measured by placing a bending vane type sensor in the flow and measuring the deflection of the vane or by placing a restriction on the flow and measuring the differential pressure of the restricted flow. Although inexpensive compared to other measurement techniques, these types of devices necessarily obstruct the fluid flow. In addition, these types of devices are not well suited for certain applications because the measurement device cannot be easily inserted and secured in the fluid flow.

More advanced measurement devices that do not obstruct fluid flow include ultrasonic and magnetic flow meters. Although more precise and reliable, these types of devices are typically very expensive, limiting their application. Also, due to limitations of the technology, these devices are often not well suited for measuring irregular flows that may include solids. These types of flow meters are also disadvantageous for many applications because they are difficult to install, calibrate, and operate.

Another type of flow measurement device is based on the known principal that vortices are created on the downstream side of an object when fluid flows past the object. If the object is allowed to move, these vortices will cause the object to oscillate periodically in the fluid flow. An example of this common phenomenon is a flag flapping in the wind. To measure flow velocity using this principal, an object is inserted in a fluid flow and allowed to oscillate. As the velocity of flow increases, the frequency of oscillation increases in relation to the flow. By measuring the frequency of oscillations of the object in the fluid flow, the velocity of the fluid flow may be determined.

A flow meter that utilized this phenomenon is disclosed in U.S. Pat. No. 2,809,520 issued to Richard, where an elongated sensing element is placed in a fluid flow, causing the sensor to oscillate. The mechanical oscillations of the sensor are converted to an electrical signal using different types of transducers including a piezoelectric crystal, electrical contacts and a condenser plate. The frequency of the electrical signal can then be read on a frequency meter and used to determine the velocity of the fluid flow.

An accelerometer is another device for measuring oscillations. Accelerometers can also measure acceleration, detect and measure vibrations, or measure inclination. Accelerometers sometimes consist of little more than a suspended cantilever beam or mass with a deflection sensor. A range of accelerometers are available to detect a magnitude of accelerations. Single axis, dual axis, and three axis accelerometers are available. Accelerometers have been used to measure the vibration of cars, machines, buildings, and the earth itself. Accelerometers have been incorporated into media players and handheld gaming devices such as Apple's iPhone™ and Nintendo's Wii™ controller.

The vortices caused by an object in a fluid flow may also be detected and measured to determine flow velocity. A flow meter utilizing this technique is disclosed in U.S. Pat. No. 3,948,098 issued to Richardson, where a plate is placed in a flowing fluid and a piezo-electric element senses changes in pressure caused by the vortices shed from the plate. The piezo-electric element generates an alternating voltage at a frequency that corresponds to the vortex pressure pulses and the flow rate of the fluid.

Although these and other devices have been developed that measure fluid flow based on the measurement of vortices or the oscillation of an object in a fluid flow, such fluid flow measurement technique has not seen widespread application. Those of ordinary skill in the sewage flow measurement art have instead focused on other technologies when developing sewage flow measurement devices. As a result, there is a need for improvement in the field of sewage flow measurement.

Specifically, many conventional sewage flow meters and associated techniques are often beyond the financial capacity and skill set of small and medium sized sanitary system authorities. Also, because of the cost and complexity of these evaluation methods, a complete review of the entire sanitary system is typically not performed by sanitary system authorities capable of affording such techniques and software. Thus, although general problem areas in the system may be identified, specific pipe restrictions and blockages may be missed.

Due to the cost of employing data collection personnel and consultants, the review and analysis of most sanitary sewer systems is typically short lived, and usually only performed in response to a specific problem or overflow. Prior art evaluation techniques are typically project-based, specific to a particular problem and not designed for ongoing assessment of the collection network. The resultant data is typically not incorporated into the ongoing operation and maintenance procedures of the authority, and is therefore not helpful in identifying and solving future problems in the system.

Moreover, flow measurement studies are merely the first step in addressing an infiltration and inflow problem. After the study has been conducted, the potential problem areas identified must be further evaluated and inspected to determine if infiltration is actually occurring, how it is occurring and how it may be addressed. This inspection may require actual physical examination of the piping by personnel and/or inspection of the piping with cameras and closed circuit television (CCTV). This critical next step can be expensive and difficult to conduct.

The value of any flow measurement study depends on its ability to accurately predict the precise portion of the system where infiltration and inflow may be occurring. If the study merely identifies large portions of the system that have infiltration, the study is essentially useless because these large portions must still be inspected.

Those of skill in the art have developed complex methodologies and expensive solutions to provide greater precision in identifying the potential location of infiltration and inflow. Some advocate increasing the flow detection points during a wet weather study to more accurately identify the portions of the system experiencing infiltration and inflow. Although this solution may be cost effective because it decreases the cost of the next step in the process, this solution is nonetheless very expensive and beyond the financial capabilities of many small and medium sized sanitary sewer system authorities. Sewage flow measurement devices are expensive, and the additional personnel required to monitor and measure additional points in the system also increases the expense of the sewage flow measurement study.

Others have developed complex sewer system modeling techniques and software for evaluating the performance of a system and predicting the effect of inflow and infiltration during a wet weather event. These techniques often require extended on-sight evaluations by consultants, which further increases the cost. Thus, there is a need for accurately and economically pinpointing the source of infiltration and inflow into a sanitary sewer system, whereby managers and owners of such systems may conduct sewage flow measurement studies that accurately predict where infiltration and inflow are occurring.

Because the evaluation of sanitary sewer systems has historically been project-based and in response to a specific problem or overflow, little attention has been paid to the ongoing maintenance and upkeep of the system. However, sewer system assets that are not regularly maintained deteriorate faster, leading to higher replacement and emergency response costs. When a sewer system is regularly maintained, its lifetime can be increased and maintenance costs distributed over the lifetime of the system. Thus, a regular evaluation and maintenance program will save money in the long run, avoid unexpected and unplanned costs, and safeguard against the health risks associated with SSO's.

Accordingly, an object of the present invention is to provide an evaluation device and method for identifying potential causes of sanitary system overflows including restrictions and blockages in the piping system, ruptured or deteriorated pipes and sources of storm water inflow and infiltration into the system.

Another object of the present invention is to provide a method and device for measuring fluid flow in a sewage system based on the oscillations, tilt, and pressure exerted upon of an object in the sewage fluid flow.

A further object of the present invention is to provide an evaluation device and method that specifically identify problem points in the sewage collection network and avoid the need to build additional or redundant capacity in the sewage system.

Yet another object of the present invention is to provide a flow measurement device and that is inexpensive to administer, simple to use, does not significantly obstruct fluid flow, and is easily inserted into the fluid flow to obtain a measurement.

Another object of the present invention is to provide an evaluation method that can be incorporated as part of an ongoing sewer system maintenance and upkeep program to prolong the life of the system and avoid unexpected costs.

Another object of the present invention is to provide an evaluation method that reduces the cost of conducting an infiltration and inflow study by minimizing the time that consultants and engineers must be on-sight to evaluate the system.

A still further object of the present invention is to provide an evaluation method that utilizes available data and technology not previously available for the analysis of sanitary sewer systems.

Finally, another object of the present invention is to provide evaluation methods that more efficiently predict the location of infiltration and inflow when compared to conventional sewage flow analysis methods.

SUMMARY OF THE INVENTION

An improved device and method for analyzing sewer systems maintains the benefits of traditional sewer analysis systems, while achieving the important objective of providing a low cost, simple, and easy to use device and method for monitoring fluid level and flow rates at multiple locations in a sewer system.

A sewage flow monitoring device according to present invention comprises a data acquisition device with an accelerometer inside a bendable tube. One end of the bendable tube is connected to a pole while the other end is submerged in a fluid flow. The top of the pole may be connected to an expansion device secured near the top of a sewer manhole. The tilt, oscillation, and pressure exerted upon the tube due to sewage fluid flow rate are measured by the accelerometer and a pressure monitor.

A method according to the present invention comprises installing several monitoring devices into sewer system manholes, recording fluid level and flow with accelerometers and pressure monitors, reading the recorded data, and displaying the data in chart or map form. Data displayed in map form may show topography, street maps, and single or multiple sewer systems. The maps may be created may in two or three dimensional. Data displayed on the maps may include fluid flow rates, fluid levels, derivatives and integrals of flow rates, and differences in fluid levels or flow between monitoring devices.

A low usage cost of sewage flow and level measuring and monitoring device according to the invention is thereby achieved by a low cost of accelerometers and pressure sensors, a small size and weight of the monitoring device, an easy replacement of components, and by ease of installing such device into a sewer system manhole. The device and method also improve safety compared with conventional method because personnel are not required to enter the manhole during installation of device. Additionally, in one variation, the pole that supports the bendable tube may be formed to be collapsible or segmented to decrease the space required for storage or transport of the device of the present invention.

The foregoing summary does not limit the invention, which is defined by the attached claims. Similarly, neither the Title nor the Abstract is to be taken as limiting in any way the scope of the disclosed invention.

BRIEF DESCRIPTION OF THE DRAWINGS

Each of the drawing figures now described shows an exemplary embodiment of the present invention.

FIG. 23 is a side view of a flow meter.

FIG. 24 is a side view of a flow meter with a bellowed lower section.

FIG. 25 is a side view of a flow meter with bellowed upper and lower sections.

FIG. 36 is a perspective view of a monitoring device comprising an expansion device with three contact points, a weight supported by a cable, and a flow meter.

FIG. 37 is a top perspective view of a monitoring device with an expansion device secured near the top of a manhole and a flow meter that is not substantially parallel to the sewer flow.

FIG. 38 is a top perspective view of a monitoring device with an expansion device secured at two locations near the top of a manhole and a flow meter that is substantially parallel the sewer flow.

FIG. 39 is a perspective view of a monitoring device comprising a catch lid connected to a flow meter and a pole, an expansion device, and a spring connected to the pole and the expansion device.

FIG. 40 is a perspective view of a monitoring device with a spring and catch lid that substantially secure one end of the flow meter to the top of a sewer pipe.

FIG. 67 is a three dimensional map showing the topography of a sanitary sewer and a storm sewer along with the position of multiple monitoring devices in each sewer.

FIG. 68 is a street map with a sanitary sewer overlay, flow arrows indicating the directional flow of the sewer, and an identified blockage in the sewer system.

DETAILED DESCRIPTION OF THE PREFERRED EMBODIMENTS

The present invention may be used with any type of fluid collection network and is particularly suited for monitoring sanitary and storm sewer systems. However, for descriptive purposes, the present invention will be described in use with sanitary and storm sewer systems.

Figure 1:
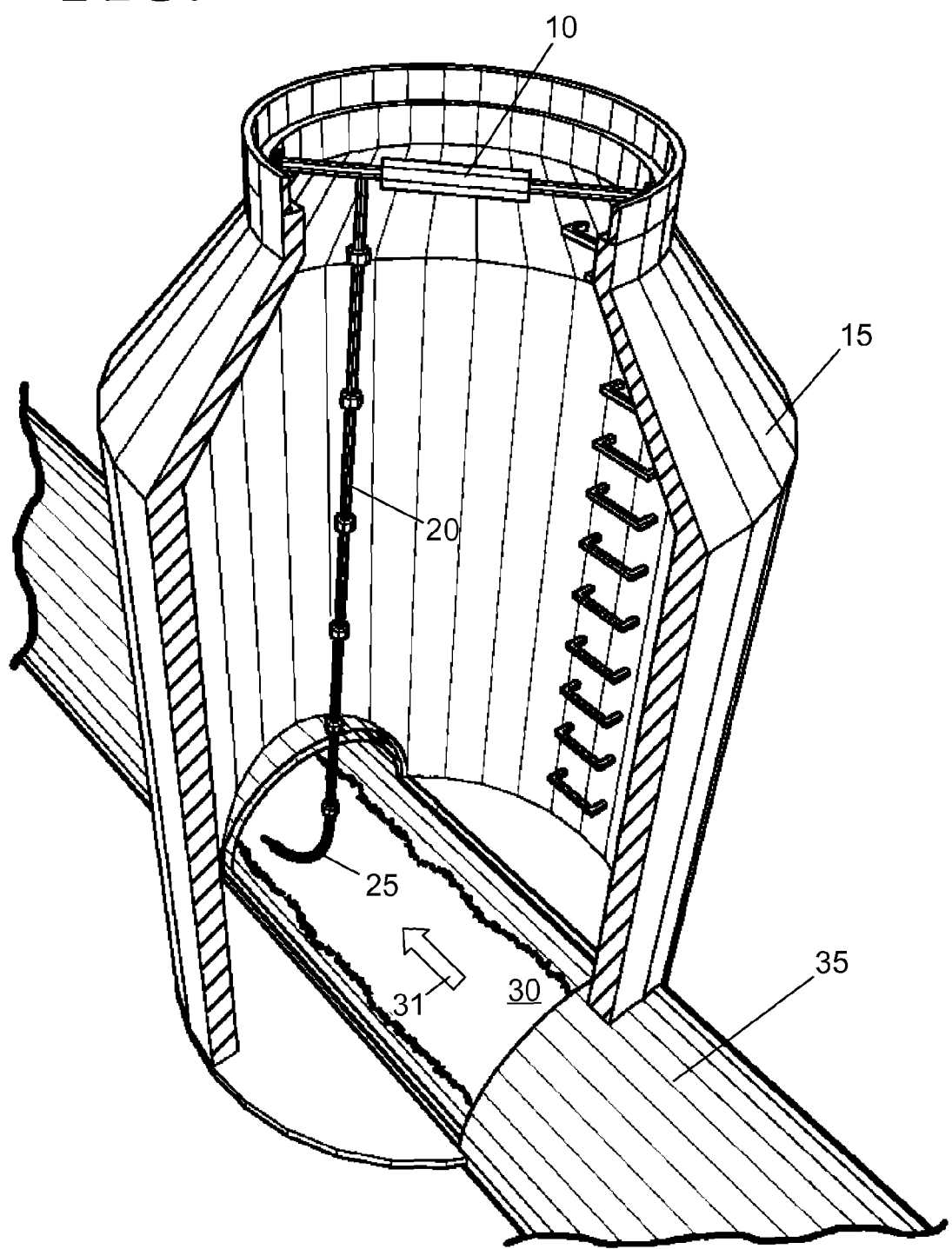
FIG. 1 is a perspective view of the monitoring device of the present invention installed in a manhole to monitor the flow in a sewer pipe.

FIG. 1 shows a perspective view of a monitoring device comprising a securing mechanism in the form of an expansion device 10 contacting near the top of a manhole 15, a vertically oriented spanning mechanism in the form of a pole 20 attached to the expansion device and substantially spanning the height of the manhole, and a flow meter 25 in the sewer flow 30 moving in a flow direction 31 inside of a sewer pipe 35. The flow meter 25 has a data acquisition device with an accelerometer and pressure monitor that records the inclination, oscillations, and pressure exerted upon the flow meter. The segmented pole 20 is adjustable so that the flow meter 25 may be positioned above the sewer pipe bottom, while still in the sewer flow. The length of the pole is substantially dependant on the height of the manhole 15. The expansion device is not positioned at the absolute top of the manhole so that a manhole cover (not shown) may be placed over the manhole while the monitoring device is installed. The manhole illustrated is part of a municipal sewer collection network and has a vertical housing embedded below a ground level, a fluid entrance opening in the vertical housing, a fluid exit opening in the vertical housing, and a round horizontal access opening above the fluid entrance opening and the fluid exit opening, the round horizontal access opening having a diameter greater than 2 feet.

In the preferred embodiment of the invention the expansion device, pole, and flow meter are constructed from a variety of robust materials such as metals or high strength polymers. While the pole and expansion device are constructed primarily from rigid materials, the flow meter is more flexible so that it bends due to the sewer flow. The flow meter may include portions that are constructed from vulcanized rubber, synthetic rubber, metals, or polymers. The use of other materials will be obvious to those of reasonable skill in the art and is within the scope of the invention. Because the monitoring device, and especially the flow meter will be exposed to wet conditions, materials used in the construction of the monitoring device may be coated or water proofed. Such coatings and treatments include galvanization, polymer coatings, wax coatings, and paint.

Figure 2:
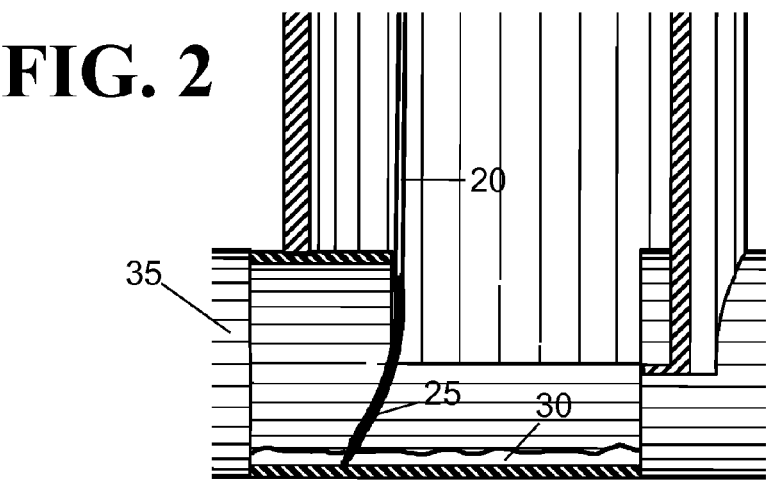
FIG. 2 is a partial side view of a monitoring device with a flow meter in a low fluid level.
Figure 3:
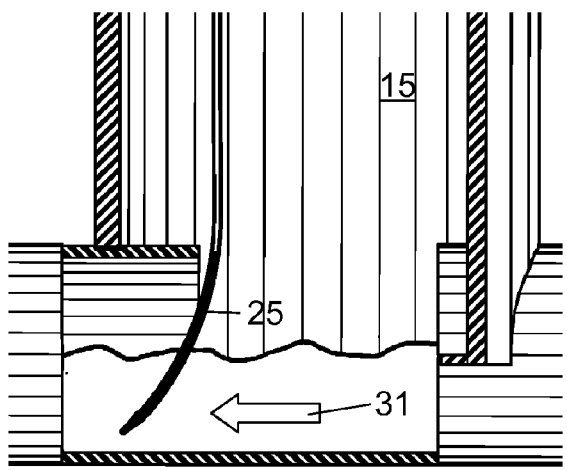
FIG. 3 is a partial side view of a monitoring device curved due to a moderate fluid level flow.
Figure 4:
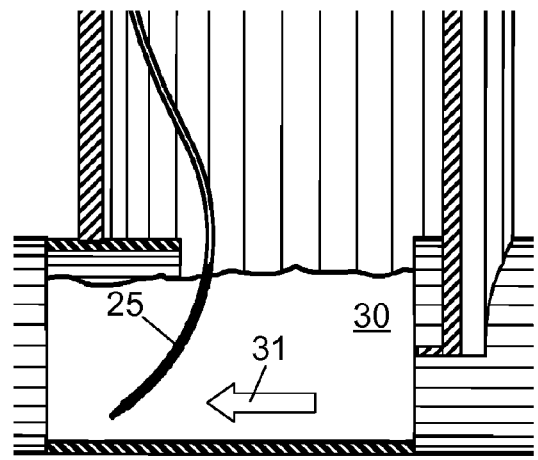
FIG. 4 is a partial side view of a monitoring device with a highly curved flow meter in a high fluid level.

FIGS. 2, 3, and 4 show a flow meter 25 in a low sewer flow, a moderate sewer flow, and a high sewer flow, respectively. In the low sewer flow, the flow meter is somewhat bent, and the water pressure exerted on the flow meter is minimal. In the moderate sewer flow, the flow meter is more curved as a result of the flow direction 31. The increased fluid level further increases the pressure exerted upon the flow meter. In a high sewer flow, the flow meter is highly curved, oscillating, and there is a substantial amount of fluid pressing down upon the flow meter. In addition to providing a measurable action, the lateral oscillations of the flow meter act to clear debris that may contact the flow meter.

Figure 5:
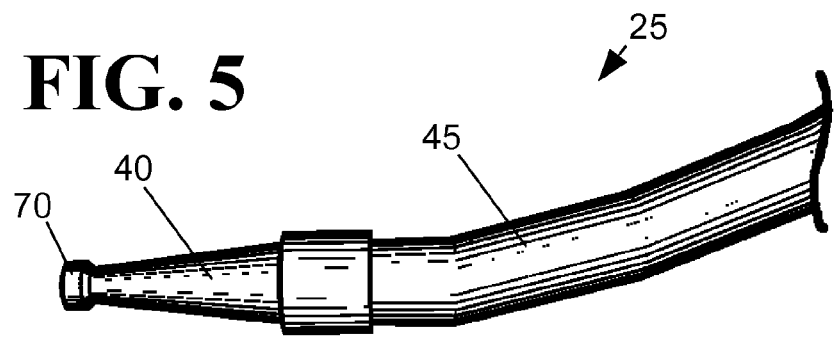
FIG. 5 is a partial side view of the bottom end of a flow meter.
Figure 6:
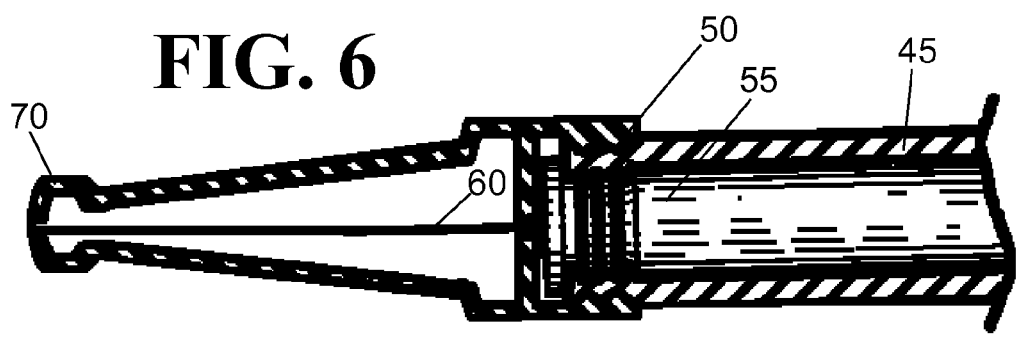
FIG. 6 is a partial cross section side view of the bottom end of a flow meter showing a data acquisition compartment and an end cap.
Figure 7:
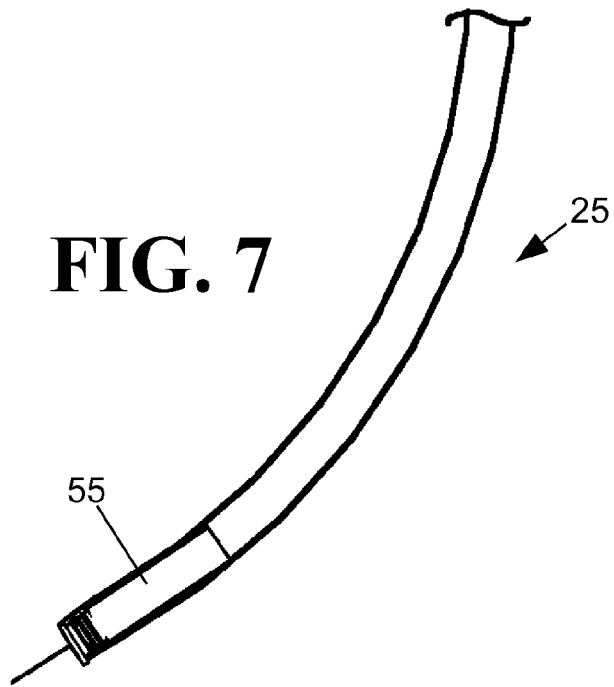
FIG. 7 is a partial cross section side view of the bottom end of a flow meter without an end cap.
Figure 8:
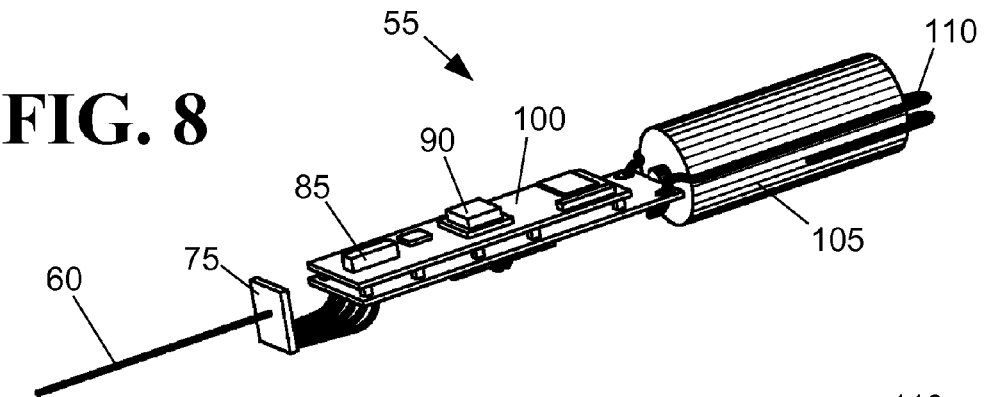
FIG. 8 is a top-side perspective view of a data acquisition device without a protective compartment casing.
Figure 9:
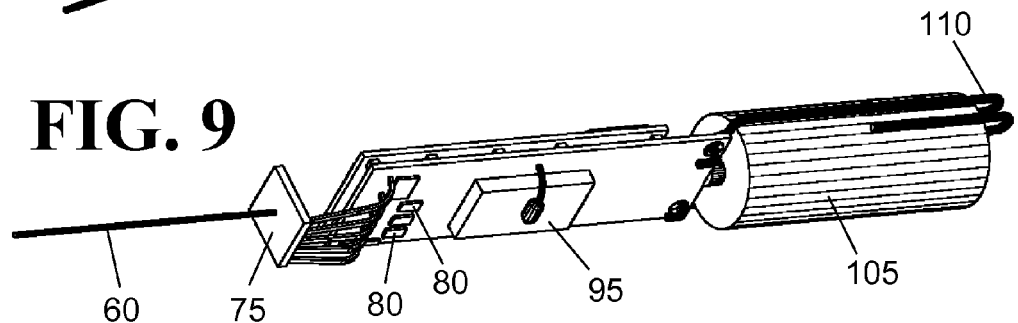
FIG. 9 is a bottom-side perspective view of a data acquisition device without protective compartment casings.
Figure 10:
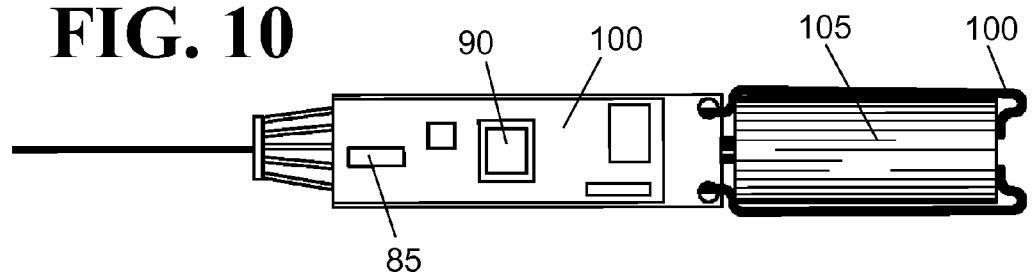
FIG. 10 is a top view of a data acquisition device without protective compartment casings.
Figure 11:
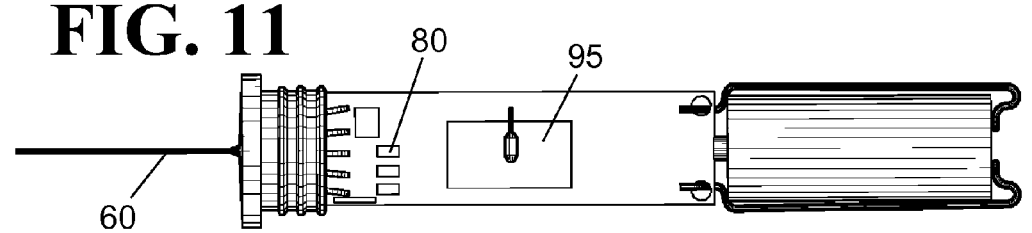
FIG. 11 is a bottom view of a data acquisition device without a rear compartment casing.

FIGS. 5 and 6 show a flow meter 25 having an threaded end cap 40 connected to the main tube 45 of the flow meter. In the preferred embodiment of the invention, the end cap is secured to the main tube by threading 50. The end cap may also have a pressure hole or orifice distance from the threading. The data acquisition device 55 shown in FIG. 6 is easily removed from the hollow cavity of the main tube of the flow meter when the end cap is unscrewed from the main tube. The data acquisition device has a pressure tube 60 that connects to an end cap opening 65. The end caps shown in FIGS. 5 and 6 have knobbed tips 70 that may be reinforced to withstand continual rubbing against sewer pipes and debris. FIG. 7 illustrates the placement of the data acquisition device inside of the main tube of the flow meter. The hollow portion of the main tube may extend from the mobile end of the tube to the stationary end, or the hollow portion may be specifically shaped to length of the data acquisition device.

Figure 12:
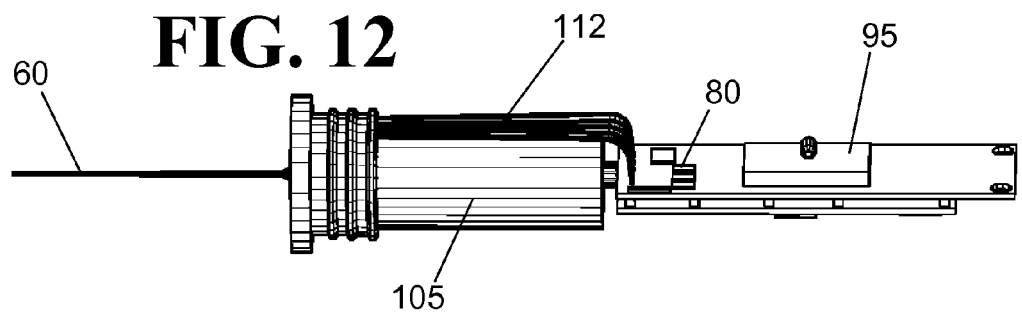
FIG. 12 is a side view of a data acquisition device with a battery between a pressure tube and an electronics assembly.

FIGS. 8-12 show a data acquisition device 55 without a compartment casing. The data acquisition device comprises a pressure tube 60 filled with a hydrophobic material, a pressure sensor 75 that measures the pressure against the flow meter, at least one accelerometer 80 that measures both the motion and curvature of the flow meter, a radio frequency identification (RFID) device 85 for transmitting information from the data acquisition device 55 to an external data collection means, computer memory 90 for storing the information gathered by the data acquisition device, a central processing unit 95 on a printed circuit board 100 for controlling the data acquisition device, a battery 105 that provides power to the data acquisition device, and a battery securing means 110 that secures the battery to the rest of the data acquisition device. The pressure sensor 75 produces an electrical pressure signal that is received by a data storage device such as computer memory on the data acquisition device. The data storage device also receives and records the tilt signal generated by the accelerometer. The battery may also be positioned between the pressure tube and electronics as shown in FIG. 12. A thin wire sheet 112 may be used to connect the electronics to the pressure tube. In addition to, or instead of an RFID data transmission device, other data transmission mechanisms may be utilized. For example, data transmission wiring could be threaded through a hollow cavity in the flexible tube that extends from the mobile end to the stationary end. The data transmission wire could further pass through a hollow portion of the pole.

When the accelerometers 80 are oscillated or tilted, an electric response/tilt signal is generated that is dependant on the oscillation and/or tilt. Because of their extreme sensitivity and wide dynamic range, accelerometers have found application as sensing devices that may be used in a variety of applications such as video game controllers. Because of their robustness, accelerometers are also well-suited for measuring and detecting changes in fluid flow velocity. Flow meters with accelerometers may be inserted in a fluid flow and allowed to oscillate in the flow. As shown in FIG. 1, the flow meter is secured at one end to the monitoring device pole. As the fluid flows past the flow meter, the free end of the flow meter will bend and oscillate in the fluid, as represented in FIGS. 2, 3, and 4.

There are many types of accelerometers that may be used in the present invention such as a piezo-film, piezoelectric sensor, shear mode, surface micro-machined capacitive, thermal, capacitive spring mass based, electromechanical servo, null-balance, strain gauge, resonance, magnetic induction, optical, surface acoustic wave, laser, DC response, high temperature, low frequency, high gravity, triaxial, modally tuned impact hammers, or seat pad accelerometer. The use of other types of accelerometers will be obvious to those of reasonable skill in the art and is within the scope of the invention.

The inclination and oscillations of the flow meter will produce an output signal from the accelerometer(s) in the data acquisition device. When the fluid flow velocity increases, the flow meter inclination and oscillations also increase, generating a proportional change in the signal generated by the accelerometer(s) of the data acquisition device.

Figure 13:
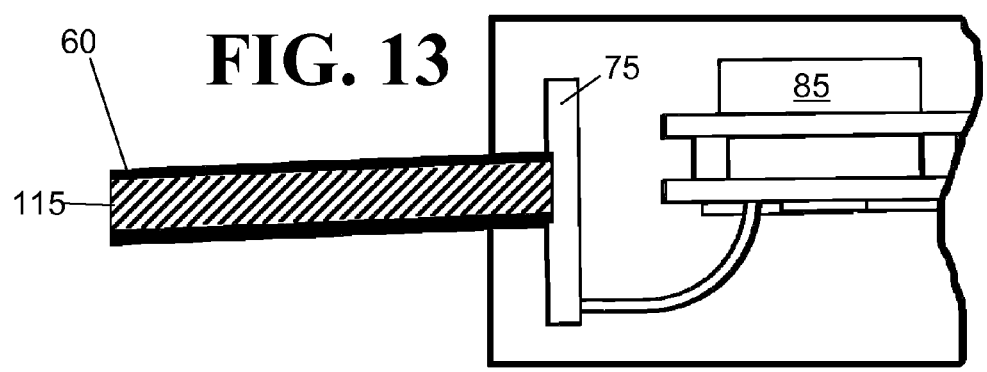
FIG. 13 is a partial cross sectional view of a data acquisition device showing a pressure sensor and a pressure tube filled with a hydrophobic material.

FIG. 13 shows a cross section of a partial view of a pressure tube 60 filled with a hydrophobic fluid 115. The hydrophobic fluid may be any substance that is non-polar and liquid at room temperature; however in the preferred embodiment of the invention, the hydrophobic substance is an oil. The pressure tube may be any length, although the preferred length is less than 10 centimeters in order to reduce the effects tube expansion. The pressure sensor may be a fiber optic sensor, a mechanical deflection sensor, a strain gauge sensor, a semiconductor piezoresistive sensor, a microelectromechanical systems sensor, a vibrating element sensor, or a variable capacitance sensor. Other kinds of pressure sensors will be obvious to those of reasonable skill in the art and are within the scope of the invention.

During a "rain event," the fluid depth inside of the storm sewer will increase along with fluid flow velocity. A rain event includes rain, sleet, melting snow, melting ice, and other events that cause the flow rate through a collection network to deviate from a standard amount. The increases in fluid pressure (~1 atm per 33 feet fluid) results in the hydrophobic fluid exerting greater forces against the pressure sensor which are recorded by the data acquisition device. Measurement of tilt and pressure are beneficial for intermittent data acquisition because extended sampling of the data is not required as it is with flow measurements through oscillations. Extended data sampling typically requires increased power consumption that decreases the expected battery life of the device.

Signals from the accelerometers and pressure meter are directed by to a central processing unit. The data from the central processing unit is transferred to a storage device such as flash memory or a magnetic hard drive. Upon request from an external data reader, the stored data is transferred via RFID or other wireless connection to the data reader. In an alternate embodiment of the invention, a wired connection could be used to transfer data to the data reader. Through empirical testing and measurement of the signal delivered by fluid flows of known velocity, a table of expected signals at certain fluid velocities may be established. The monitoring device may then be used to measure the velocity of a fluid flow under similar conditions.

The monitoring device may also be used to measure relative changes in fluid flow velocity and depth regardless of whether an actual velocity and depth are measured and recorded. To measure relative changes in velocity and depth, the flow meter of the measuring device is simply placed in a fluid flow and the output of the signal monitored. If the fluid flow velocity and depth increases, the signal from the accelerometer and pressure sensor will change relative to the initial conditions. By comparing relative changes instead of absolute changes, sewer pipes of varied capacities may be easily compared. Additionally, the use of relative change in flow rate/flow depth assists in comparing locations with dissimilar rain levels (e.g. Seattle and Las Vegas).

Although less precise than more developed technologies for measuring fluid flow velocity, the present invention offers significant cost savings over other technologies. Because accelerometers and pressure sensors are relatively inexpensive, they may be more widely deployed than more expensive flow measurement devices. For example, the measurement device and method may be inexpensively deployed throughout a sanitary sewer system to monitor and measure fluid flow at multitudes of points in the system for extended periods of time. This widespread deployment can offer increased flow monitoring advantages and provide historical flow data that could not be economically realized with more expensive devices.

Figure 14A:
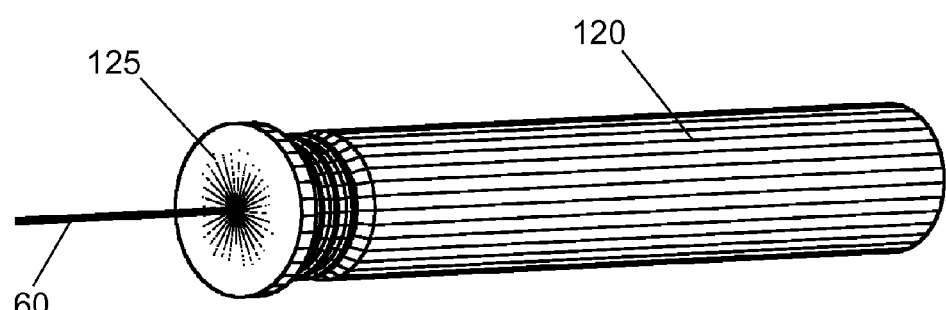
FIG. 14A is a side perspective view of a data acquisition device with a front and rear compartment casing.

FIG. 14A shows a data acquisition device with a rear compartment casing 120 interconnected with a front compartment casing 125. The front compartment casing 125 has an orifice through which the pressure tube 60 extends. In the preferred embodiment of the invention, the rear compartment casing is made from a rigid and robust plastic, while the front compartment casing is made from a robust and flexible material such as rubber. The flexibility of the front compartment casing allows it to form a watertight seal with the main tube of the flow meter. The end cap further assists in providing a watertight seal. The rigidity of the rear compartment casing helps to protect the electronics of the data acquisition device from objects that impact the flow meter. As shown in FIG. 14A, the pressure tube passes through a tube orifice in the front face of the front compartment casing. Extending from the front face is a cylindrical outer surface with a diameter greater than the inner diameter of the flexible tube. The larger cylindrical portion of the compartment limits how for into the flexible tube the data acquisition device may be placed. Inside of the flexible tube, the compartment has a cylindrical surface with a diameter similar to the inner diameter of the flexible tube. The thinner cylindrical surface of the compartment contacts the tube to form a substantially watertight seal with the flexible tube.

Figure 14B:
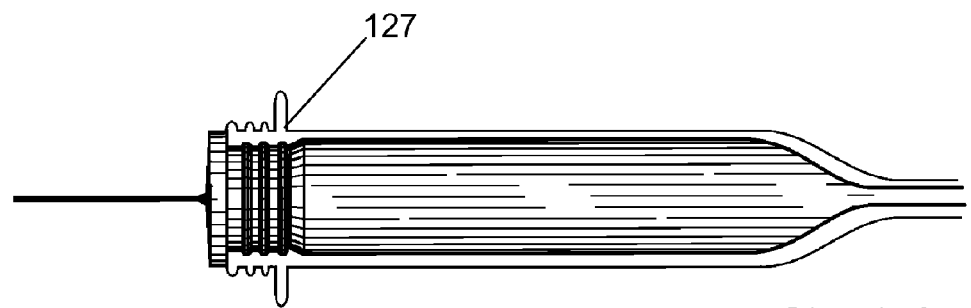
FIG. 14B is a side perspective view of a data acquisition device with a exterior support tube around the rear compartment casing.

FIG. 14B shows a data acquisition device that enclosed/encapsulated within a plastic support tube 127. The support tube/cylindrical waterproof compartment is shaped such that in can be easily secured within a hollow cavity or core of the main tube 45 of the device. The width of the tube is similar to the diameter of the hollow cavity of the inner tube so that a tight connection between the main tube and the support tube may be made. Like the main tube, the support tube may have threading to secure an end cap to the device. Alternatively, the support tube threading may be in lieu of main tube threading. In hospitable environments, the device may be used be used without the added protection of the main tube.

Figure 15:
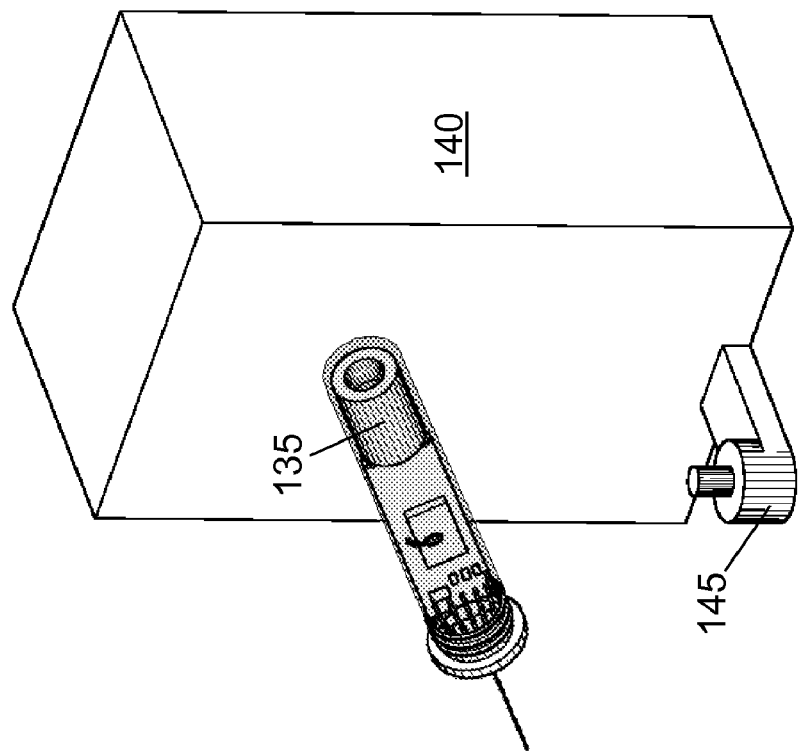
FIG. 15 is a perspective view of a data acquisition device with front and rear compartment casings that enclose the electronics and inductively chargeable battery of the data acquisition device.
Figure 16:
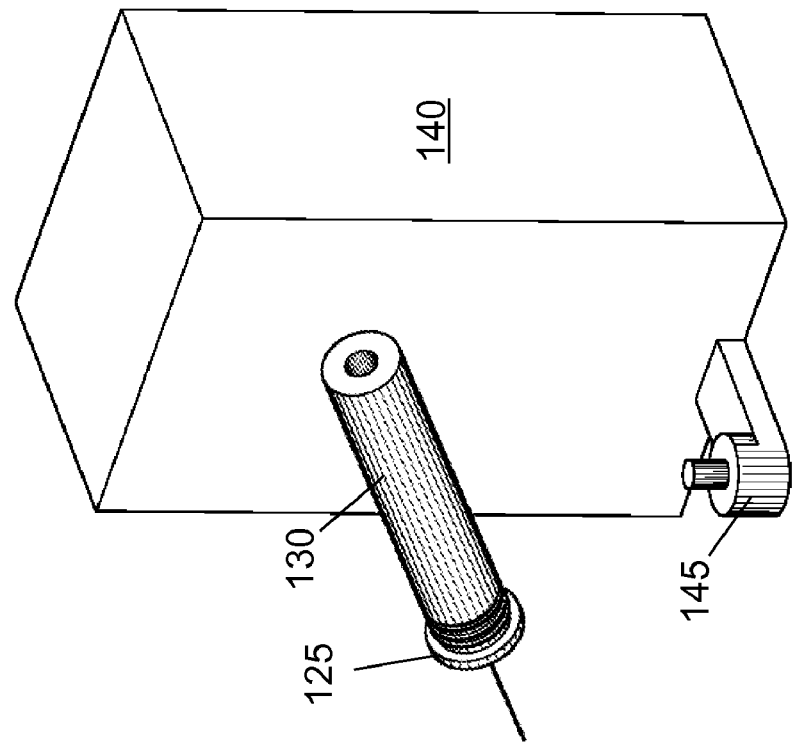
FIG. 16 is a perspective view of a data acquisition device with a translucent rear compartment casing and a front compartment casing that completely enclose the electronics and inductively chargeable battery of the data acquisition device.

FIGS. 15 and 16 show an alternate embodiment of the data acquisition device with a continuous rear compartment 130 that cooperates with a front compartment casing 125 to completely enclose the data acquisition device. Completely enclosing the data acquisition device reduces the likelihood of water damaging the electronics of the data acquisition device. However, with the data acquisition device completely sealed the battery is not as easily replaceable as in the preferred embodiment of the invention. In order to provide power to the data acquisition device, an inductively chargeable battery 135 is sealed inside the rear compartment casing. A RFID data reader 140 may have an inductive charging device 145 that charges the battery as the data from the data acquisition device is read. Inductively chargeable batteries are often used in situations where the batteries must be completely sealed to avoid water damage, such as with electric toothbrushes.

Figure 17:
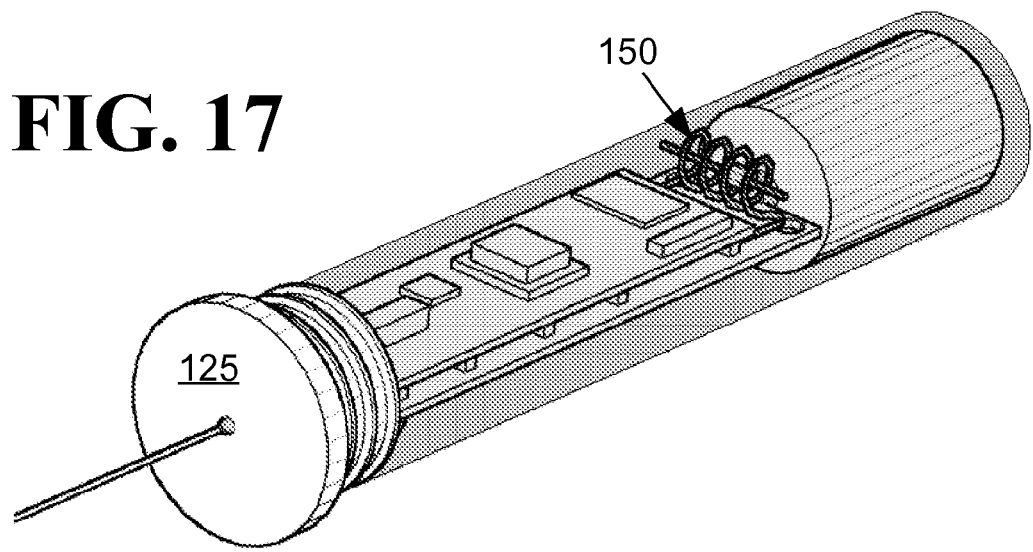
FIG. 17 is a perspective view of a data acquisition device having a translucent rear compartment casing and a linear generator.
Figure 18:
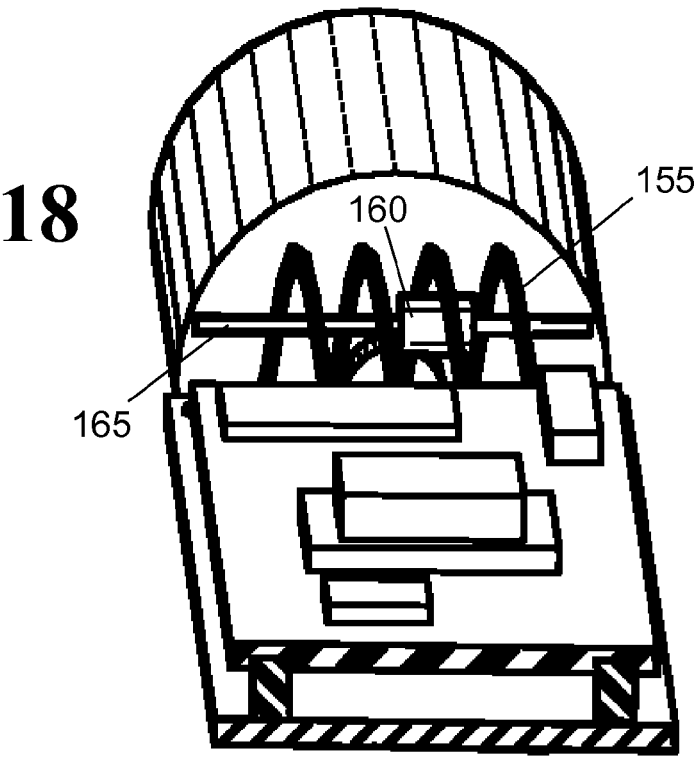
FIG. 18 is a partial perspective view of a data acquisition device having a linear generator.

FIGS. 17 and 18 show a data acquisition device that has a miniature linear generator 150 that provides additional power to the data acquisition device. The linear generator has a coil of conductive windings 155, a freely moveable permanent magnet 160, and a track 165 on which the permanent magnet moves. As the data acquisition device oscillates in the sewer flow, the permanent magnet also oscillates back and forth within the conductive coils producing an alternating voltage that may be used to power the data acquisition device. The addition of a linear generator increases the length of time that the monitoring device may be deployed and reduces the long term costs associated with obtaining new batteries and replacing the old batteries.

Figure 19:
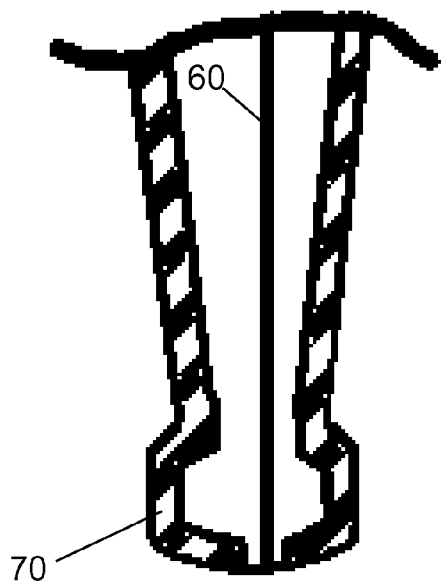
FIG. 19 is a partial cross sectional view a flow meter end section showing a knobbed end and a pressure line.
Figure 20:
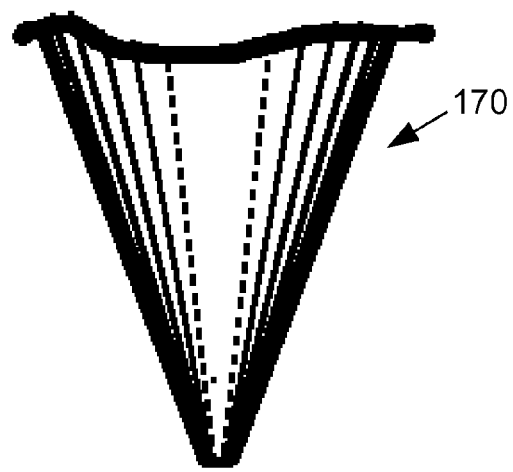
FIG. 20 is a partial view of a flow meter end section showing a tapered end.
Figure 21:
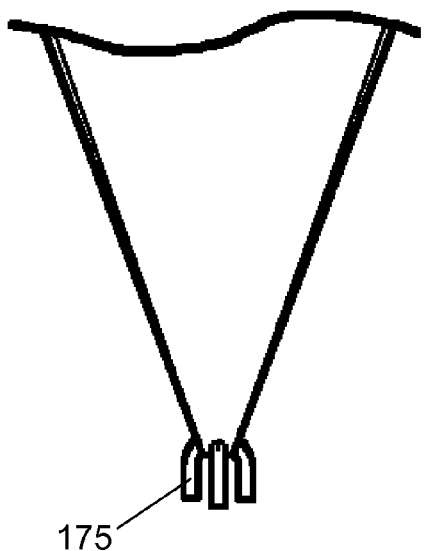
FIG. 21 is a partial view of a flow meter end section showing a tapered end with tongs to prevent the pressure line from contacting the wall of a sewer.
Figure 22:
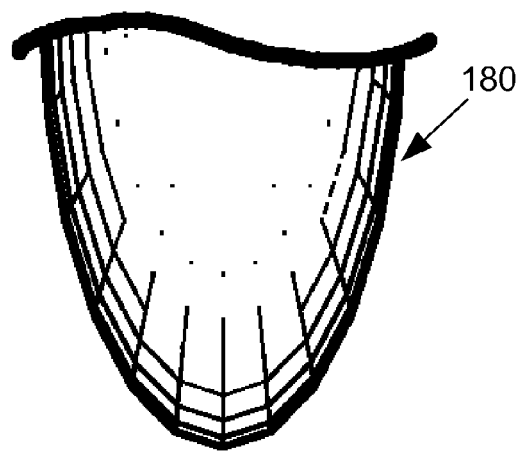
FIG. 22 is a partial view of a flow meter end section showing a rounded end.

FIGS. 19-22 show various embodiments of the bottom end of the flow meter. FIG. 19 shows a cross section of a tapered end cap with a knobbed tip 70. The knobbed tip disrupts the fluid flow and creates turbulent flow vortices. The turbulence of the solution assists in oscillating the accelerometer in the data acquisition device which improves the sensitivity of the device. FIG. 20 shows a smooth tapered end cap 170. The absence of a knob reduces the likelihood of flotsam in the sewer collecting on the flow meter. FIG. 21 shows a tapered end cap with spacer tongs 175 that serve to prevent the end of the tip from resting against the bottom of the sewer pipe in low sewer flow conditions. Rubbing the opening of the pressure tube 60 against the bottom of a sewer pipe may be detrimental to pressure measurement. FIG. 22 shows a portion of a flow meter with a round end cap 180. A round end cap decreases the required length of the pressure line thereby decreasing fluctuations in pressure readings associated with expansion or contraction of the pressure tube.

FIGS. 23-35 show various embodiments of a flow meter flexible shaft. FIG. 23 shows a flow meter with a smooth main section 185, a tapered end, and a knobbed tip. The smooth main section is easily manufactured, provides a substantially uniform cross section, and reduces the number of points to which sewer debris can attach. FIG. 24 shows a flexible shaft with a lower bellowed main section 190. The bellows act to provide a region that bends with less resistance than the rest of the main section so that the flow meter oscillates and bends more during low sewer flow conditions. An alternate embodiment is shown in FIG. 25 where the main section of the flow meter has a lower bellowed section 190 and an upper bellowed section 195. The upper and lower bellows may be size selected to provide a desired non-linear response to an increase in sewer flow rate.

Figures 26, 27, 28:
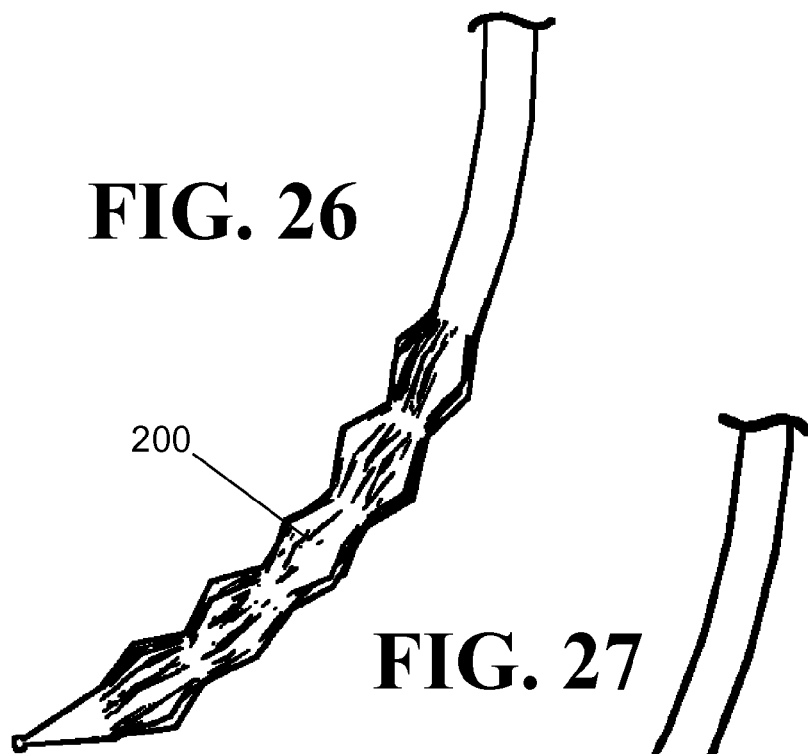
FIG. 26 is a side view of a flow meter with a non-smooth end section.
FIG. 27 is a side view of a flow meter with two end sections.
FIG. 28 is a side view of a flow meter with a tapered midsection.

FIG. 26 shows a flow meter with flexible shaft having a roughened main section. The rough sections 200 may serve as a visual indication of flow meter depth in sewer flow during the installation of the device. FIG. 27 shows a flow meter with twin end sections 205. Increasing the number of end sections and associated data acquisition devices increases the robustness of the system because the measuring device can still operate with one malfunctioning data acquisition device. In addition to increasing the robustness of the measuring device, interactions between with the end sections to be measured as an additional way to monitor sewer flow velocity and level. FIG. 28 shows a flow meter with a tapered main section 210. The lesser thickness of the main section decreases the flow meter rigidity increasing sensitivity to lower sewer flow conditions.

Figure 29:
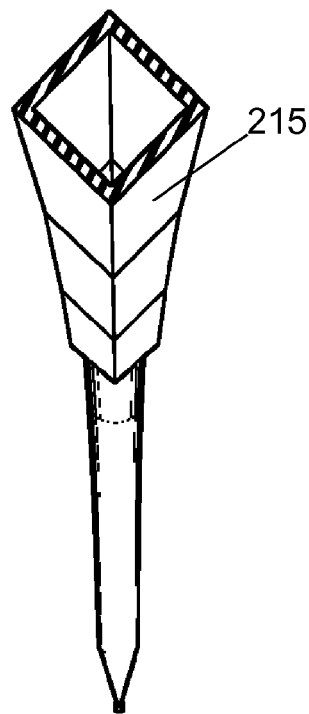
FIG. 29 is a top cross-sectional view of a flow meter with a square top section and a round midsection.
Figure 30:
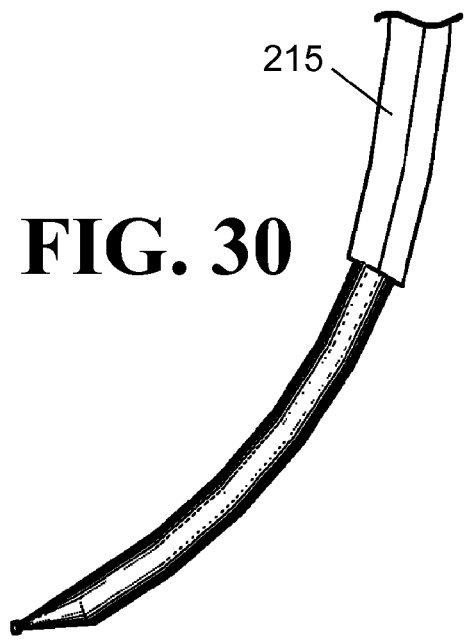
FIG. 30 is a side view of a flow meter with a square top section and a round midsection.
Figure 31:
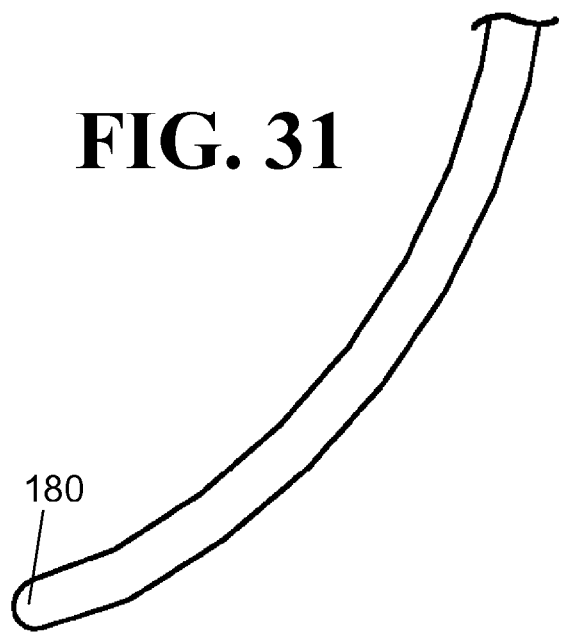
FIG. 31 is a side view of a flow meter with a rounded end.
Figure 32:
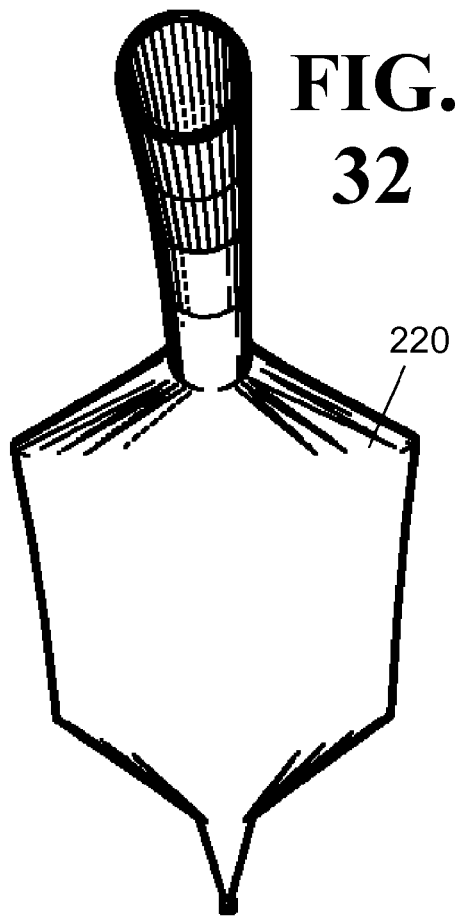
FIG. 32 is a top view of a flow meter with a flared section.

FIGS. 29 and 30 show flow meters with rectangular upper main sections 215. The rectangular sections serve to increase the rigidity of the flow meter in certain locations, much like the bellowed sections serve to decrease the rigidity of the flow meter. FIG. 31 shows a flow meter with a rounded end cap. A rounded end cap 180 allows the data acquisition device to be closer to the end of flow such that the pressure line may be shorter in length. FIG. 32 shows a flow meter with a flared lower main section 220. The flares increase the rigidity of the flow meter, while also increasing the cross section that the flow meter presents to the oncoming sewer flow. The increased cross section causes more force to be exerted resulting in a greater flow meter bend.

Figure 33:
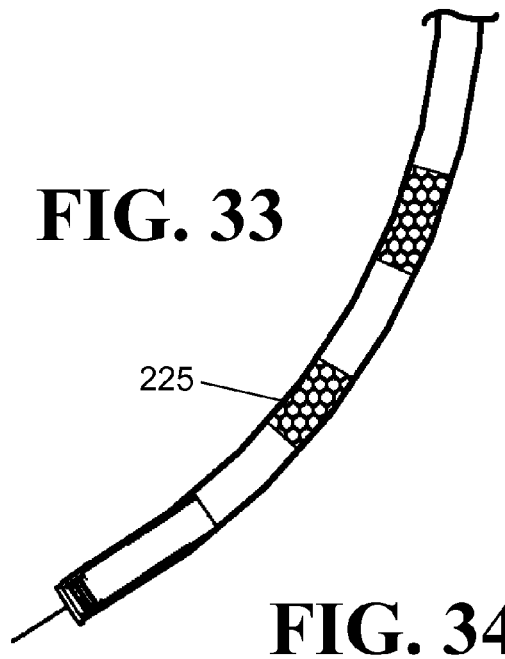
FIG. 33 is a sectional view of a flow meter with a weighted data acquisition device and two other weighted sections.
Figure 34:
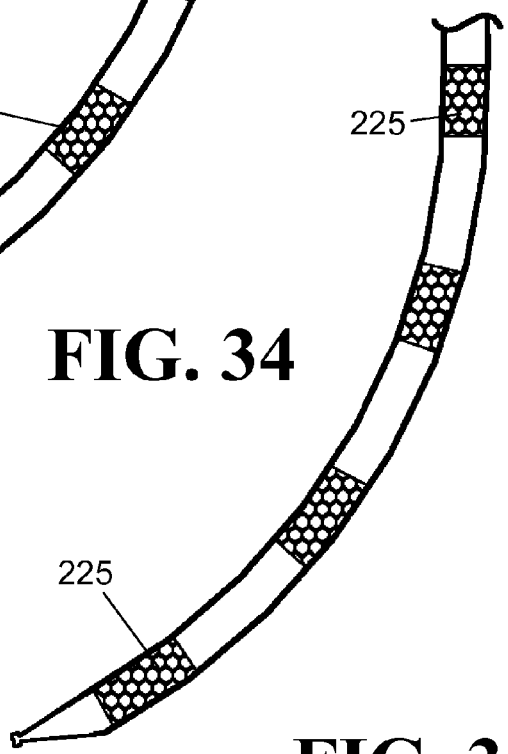
FIG. 34 is a sectional view of a flow meter with three weighted sections.
Figure 35:
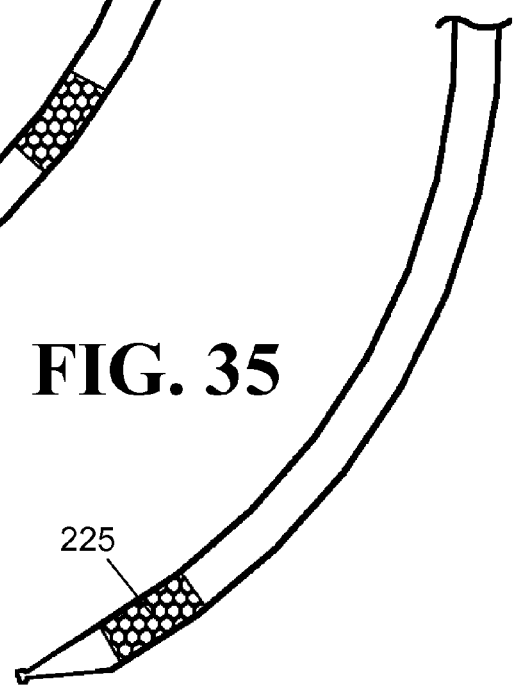
FIG. 35 is a sectional view of a flow meter with one weighted section.

FIGS. 33-35 show various cross sections of the flow meter with weights 225 placed inside the flow meter. The weights decrease the response of the flow meter at lower flow rates, but improve the response linearity of the measuring device at higher flow rates. As with the various features that may be included on the exterior of the flow meter, the interior weights may be placed to achieve a desired measurement response for a given flow rate.

FIG. 36 illustrates a measuring device that utilizes a cable 230 and a cable weight 235 to connect the flow meter to the securing mechanism/expansion device. The use of a cable instead of a rigid pole may reduce the amount of time it takes to install the measuring device because the cable may be wound to the proper position thus reducing the number of tools that must be used to install the device.

FIGS. 37 and 38 illustrate the ability of the flow meter 25 flexible shaft to oscillate laterally or be moved by to the sewer flow. In the illustrated embodiment of the invention, the pole spanning the height of the manhole is substantially immobile relative to the sewer fluid flow. In spanning the manhole, the pole has a top portion near an manhole accessing opening of the sewer collection network and a bottom portion secured to the anchored end of the flexible shaft. The moveable end of the flexible shaft is partially submerged in the fluid flow while the stationary end of the shaft is anchored to the rigid pole. In addition to being a measurable action, the oscillation of the flow meter helps to clear off any sewer debris.

FIG. 39 shows an embodiment of a measuring device that has a spring 240 and catch lid 245 connected to the pole. A hinged connection is used between the pole and the securing mechanism/expansion device so that the pole may be tilted based on the forces acting upon it. When there are not significant external forces, the spring pulls or pushes the poll away from a vertical orientation. The angle of the pole may be such that the top of the flow meter is in close proximity to the walls of the manhole. The catch lid functions to catch on the top portion of a sewer pipe. By standardizing the vertical position of flow meters, the measurement variability of multiple flow meters may be reduced. FIG. 40 shows an illustration of a measuring device with a spring and catch lid securing the location of the top end of the flow meter. In the illustration, the fastening mechanism is secured proximal to the opening in the sewer collection network.

The segments of the pole may be connected together by a securing means that does not require the use of external tools, such as quick connects commonly used with garden hoses. If screw threading is used to secure the segments of the pole, the poles may have integral handles to act as leverage points when workers tighten down the threads. Alternatively, a single non-segmented pole may be used by trimming the pole to an appropriate length during installation of the monitoring device.

Figure 41:
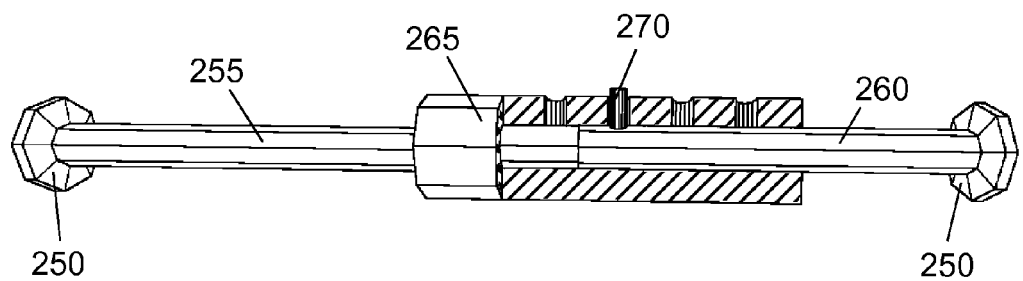
FIG. 41 is a partial cross-sectional side view of an expansion device.
Figure 42:
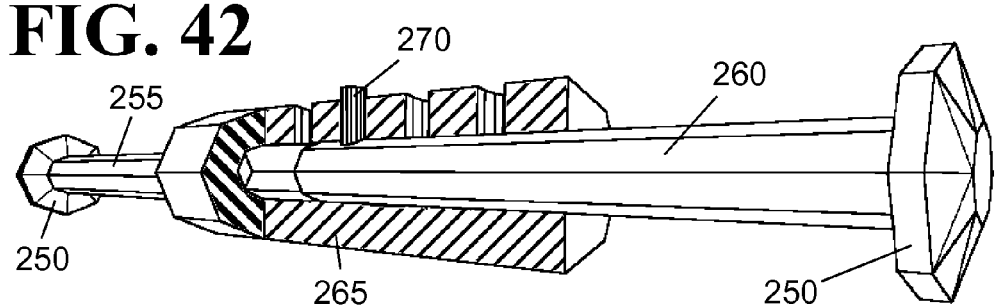
FIG. 42 is a partial cross-sectional side perspective view of an expansion device that functions to secure the monitoring device near the top of a manhole.

FIGS. 41 and 42 show partial cross sections of securing mechanism in the form of an expansion device 10 or fastening mechanism with two post/shaft caps 250, an immobile post/shaft 255, a mobile post/shaft 260, and a locking portion 265 adapted for keeping the expansion device in an extended position for securing the device to an manhole access opening and a retractable position for removing the device from a municipal sewer collection network. The immobile shaft is affixed to the locking portion, while the mobile shaft is variably connected to the locking portion. The mobile shaft includes a locking pin 270 that is capable of fitting into a locking slot in the locking portion. The locking pin can be compressed or removed in order to unlock the moveable shaft.

Figure 43:
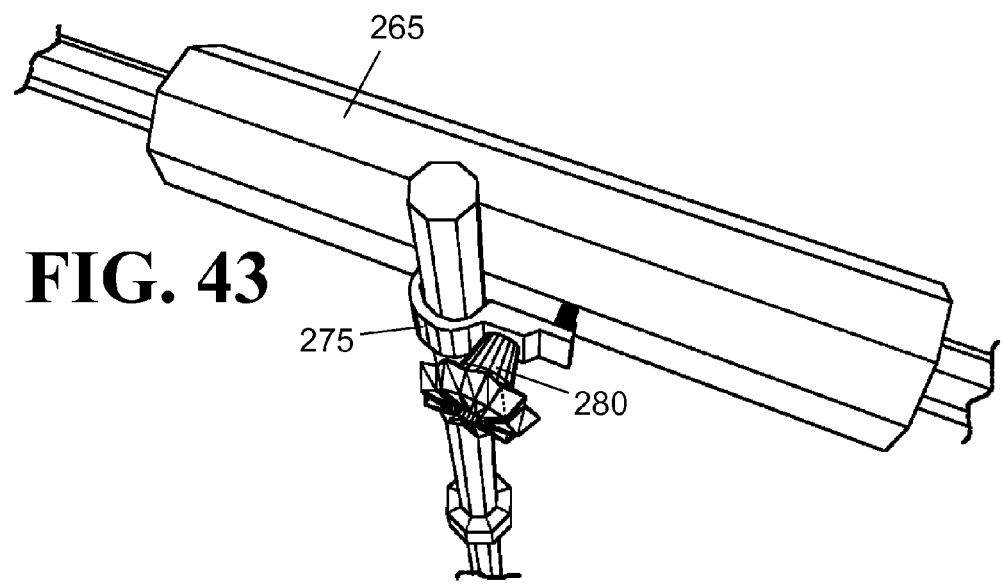
FIG. 43 is a perspective view of a monitoring device with an expansion device selectively secured to a portion of a pole.

FIG. 43 shows a partial perspective view of an expansion device/fastening mechanism with a rigid pole 20 variably connected to a locking portion 265 by means of a clamping device 275. In the preferred embodiment of the invention, the clamp includes a tension knob 280 that is operable to selectively secure the pole to the expansion device without the need for additional tools.

Figure 44:
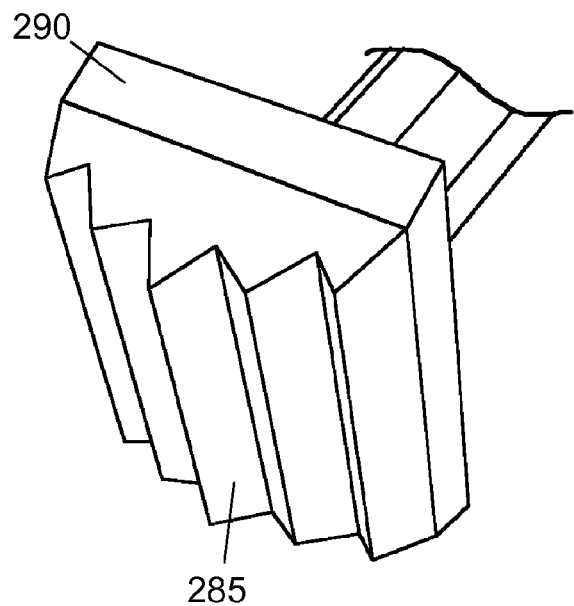
FIG. 44 is a partial perspective view of an expansion device with a cushioned shaft cap.
Figure 45:
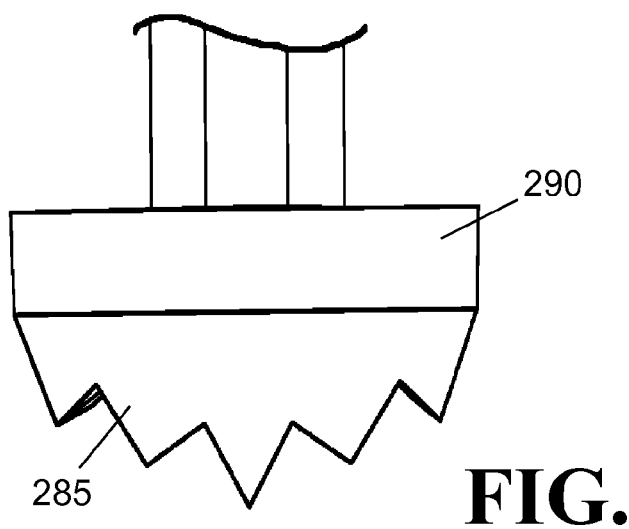
FIG. 45 is a partial top view of an expansion device with a cushioned shaft cap.
Figure 46:
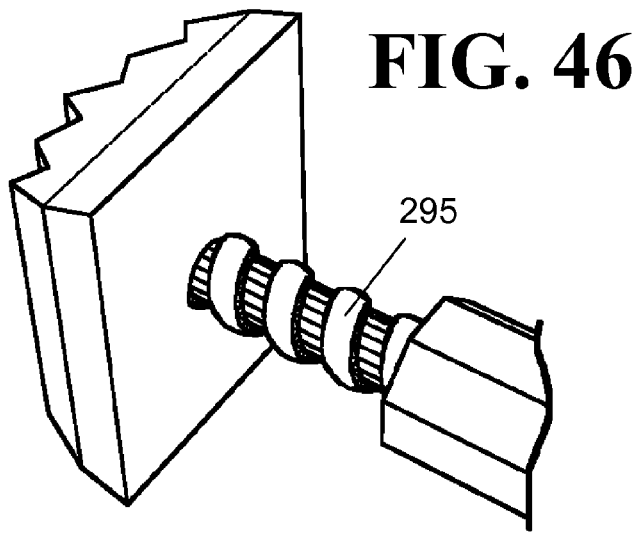
FIG. 46 is a partial perspective view of an expansion device with a secondary screw-type positioning means.

FIGS. 44 and 45 show perspective and top views, respectively, of an alternate embodiment of an expansion device shaft/pole/post cap. In the embodiment illustrated, a substantially flexible section 285 such as a compressible cushion that is compressible against a manhole wall, while a substantially rigid section 290 acts to press the flexible section/compressible cushion against a manhole wall. The rigid sections of an expansion device are preferably constructed from metals or high strength polymers, while the flexible sections are preferably constructed from natural or synthetic rubber.

Figure 47:
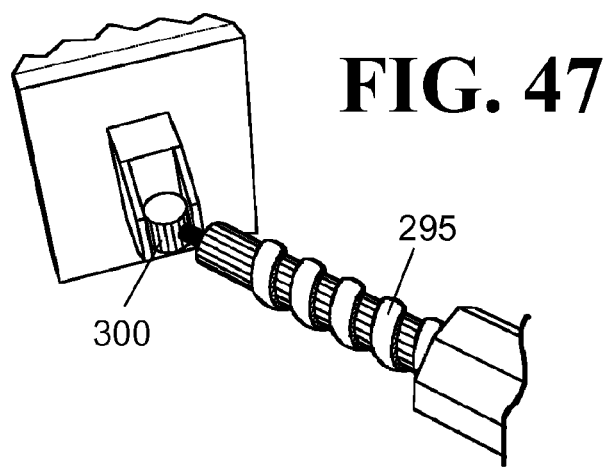
FIG. 47 is a partial perspective view of an expansion device with a secondary screw-type positioning means and a shaft cap that is rotated about a pivot point.
Figure 48:
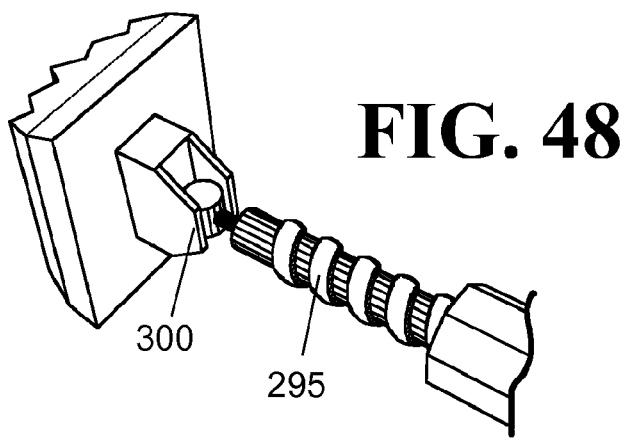
FIG. 48 is a partial perspective view of an expansion device with a secondary screw positioning means and a pivot point near the shaft cap.
Figure 49:
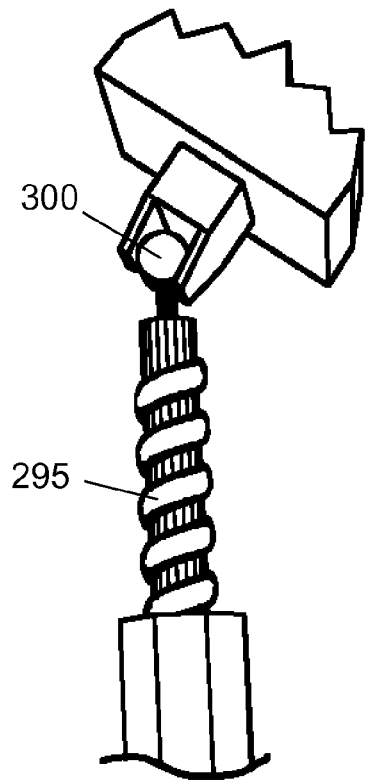
FIG. 49 is a partial top view of an expansion device with a secondary screw positioning means and a shaft cap that is rotated about a pivot point.

FIGS. 46-49 show partial views of an expansion device with a secondary screw-type positioning means 295. Finer positioning of the post/shaft cap is achievable with rotation of the screw than with adjustment of the locking pins shown in FIGS. 40 and 41. In the preferred embodiment of the invention, the course adjustments to the expansion device are made with the locking pin, and fine adjustments are made by rotating the screw. FIGS. 47-49 show an expansion device with a rotation/pivot point 300 in close proximity to the shaft cap. The pivot point aids in securing the device near a manhole access opening by allowing the device to adapt to irregular contours of the opening. The rotation of the shaft caps allows the expansion device to better conform to any irregularities in the curvature of a manhole opening.

Figures 50, 51, 52:
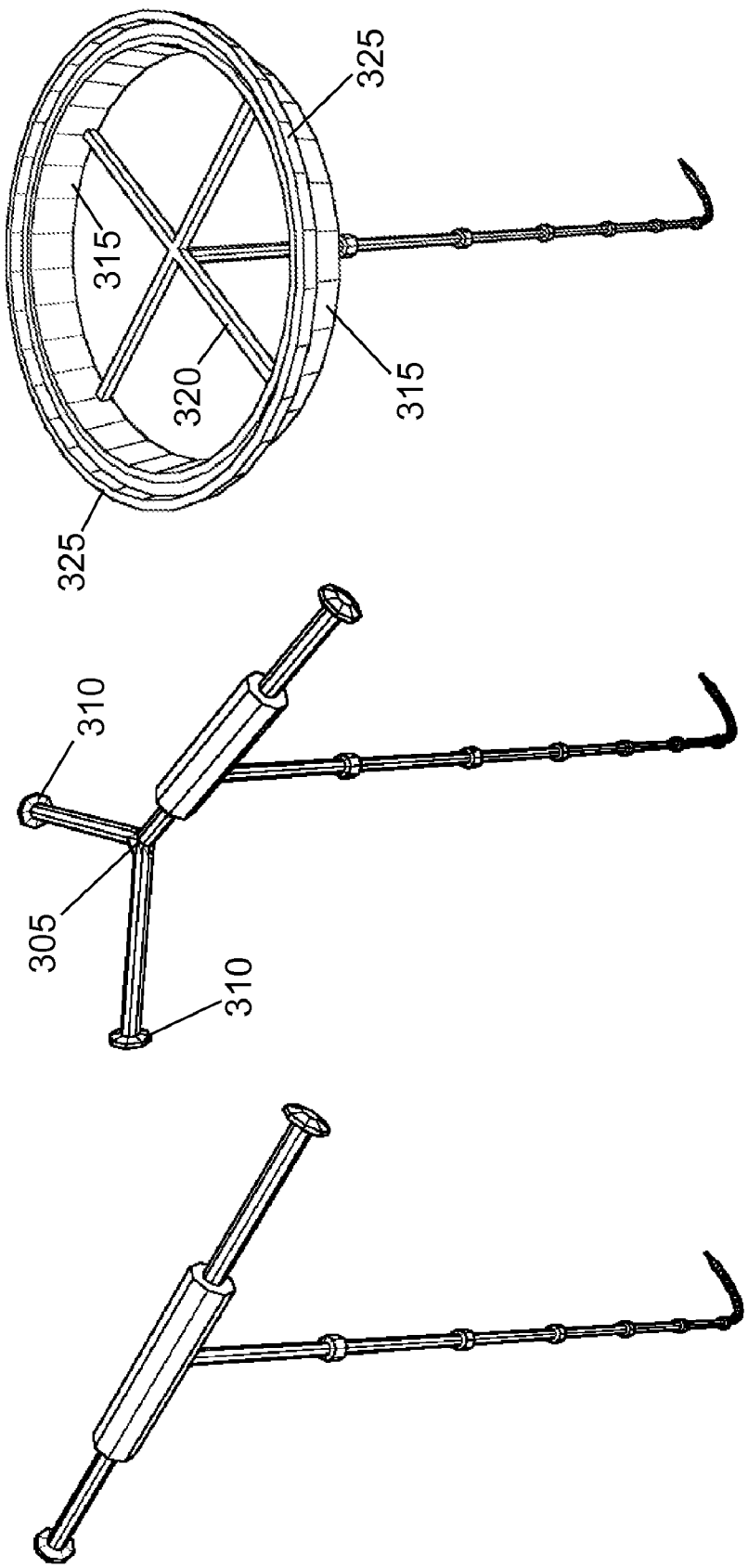
FIG. 50 is a perspective view of a monitoring device with an expandable segmented pole connected to a flow monitor and an expansion device.
FIG. 51 is a perspective view of a monitoring device with an expansion device that has three portions for contacting near the top of a manhole.
FIG. 52 is a perspective view of a monitoring device with an expandable segmented pole that is supported by a manhole insert with an outer lip having a diameter substantially similar to a manhole cover.

FIG. 50 shows an isolated monitoring device with an expansion device, a pole, and a flow meter. FIG. 51 shows an isolated monitoring device with three shaft caps and a split immobile shaft/post. The split shaft 305 and the double shaft caps 310 assist in securing the measuring device to the manhole. FIG. 52 shows an alternate embodiment of a measuring device where a lipped ring is used instead of an expansion device. The lipped ring has a circular section 315 with a diameter smaller than the narrowest portion of a manhole opening. The measuring device pole is connected to support beams 320 that are connected to the interior portions of the circular section. Also connected to the top of the circular section is a thin lip 325 that has a diameter substantially similar to a manhole cover. Because the thin lip diameter, it is nearly impossible for the lipped ring to accidentally fall into the sewer.

Figure 53:
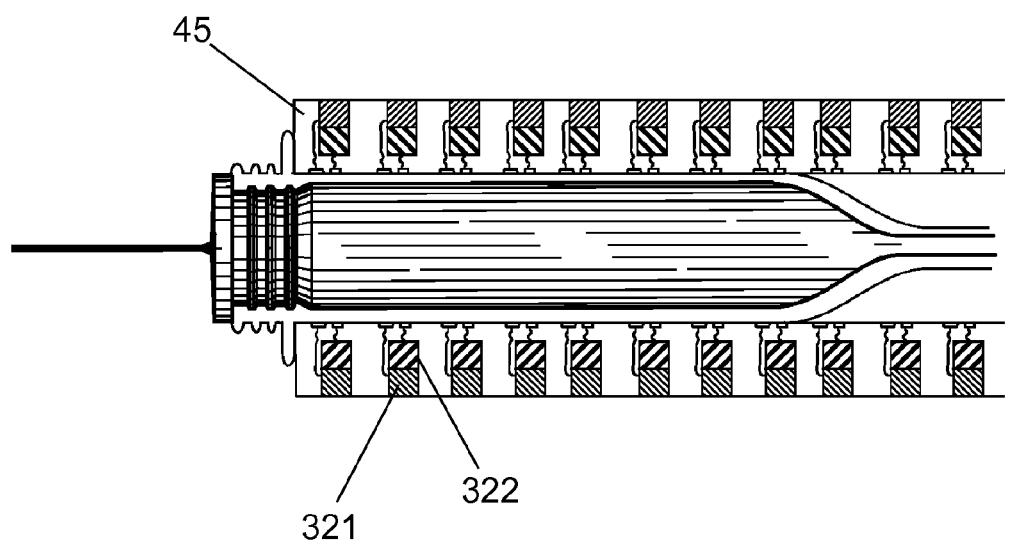
FIG. 53 is a side view of a data acquisition device having a plurality of heat sensors imbedded in the flexible tube.
Figure 54:
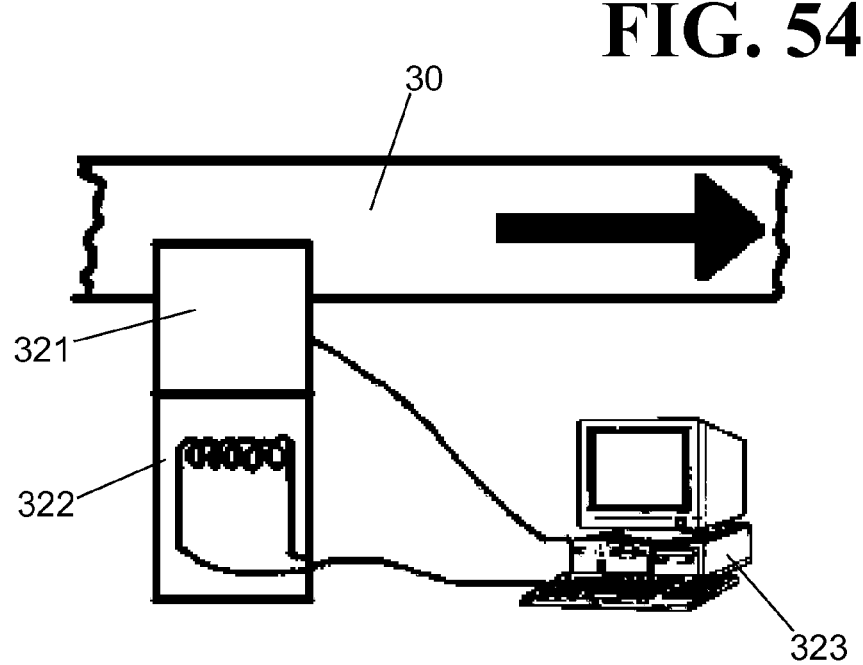
FIG. 54 is a schematic of a sensor for measuring the flow rate of a solution, the sensor having a heat source and a temperature monitor.

FIG. 53 shows a main tube 45 having a plurality of thermal flow heat sensors 321 imbedded in the mobile end and radially disposed about the data acquisition device for measuring the flow rate of a solution. Proximal to the heat sensors are heat sources 322 for quickly warming up the heat sensors to a desired temperature. FIG. 54 shows a simplified schematic of a heat sensor measuring the flow rate of a solution 30. Initially, a control device 323 monitors the ambient temperature of the heat sensor. Next, the control device operates the heat source until the heat sensor has reached a predetermined temperature. The heat source is then disengaged and readings from the heat sensor are recorded at various intervals. Based on the measured ambient temperature and the rate at which the heat sensor returns to ambient levels, the flow rate of the solution can be determined. Faster solution flow rates cause a faster return to ambient temperature levels. In one embodiment of the invention, numerous heat sensor and heat source pairs are imbedded in the main tube in order to allow for flow rate detection at multiple locations on the device. Additionally, the response from multiple sensors allows for improved flow measurement by using statistical averaging.

FIG. 53 also illustrates a cylindrical waterproof compartment circumscribed about and encapsulating the data acquisition device, where the cylindrical waterproof compartment has a width substantially similar to the inner diameter of the flexible shaft/tube. The waterproof compartment has a threaded section slightly exterior to the flexible tube. The threaded section may cooperate with a threaded end cap like the ones illustrated in FIGS. 5, 6, 20, 21, and 22.

Figure 55:
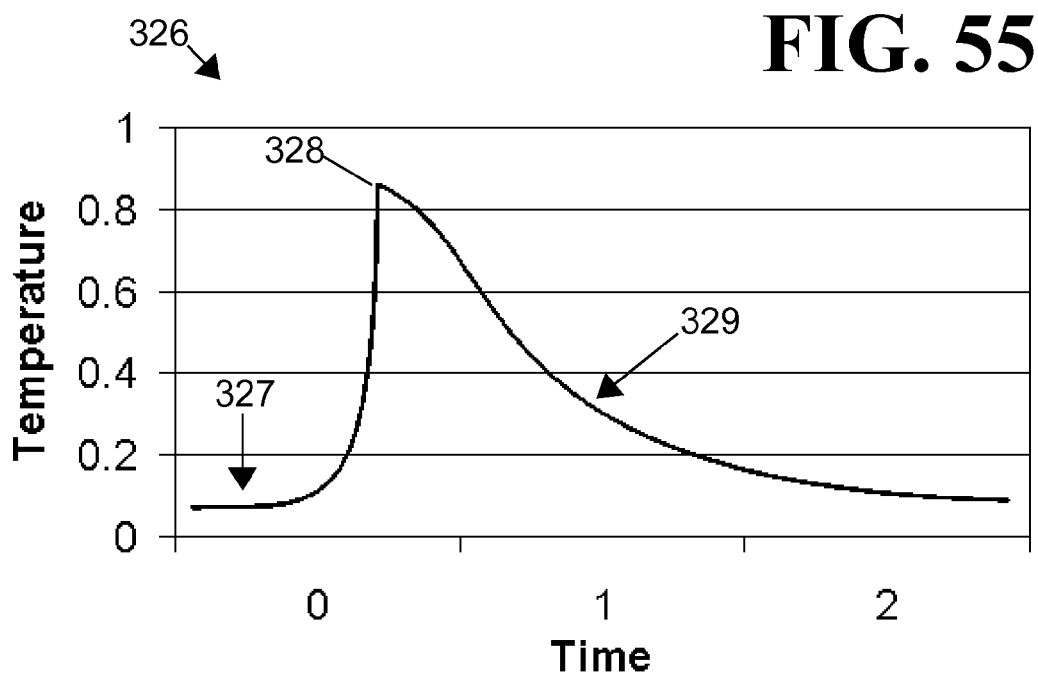
FIG. 55 is a sample response curve of a temperature monitor in a fast moving solution stream.
Figure 56:
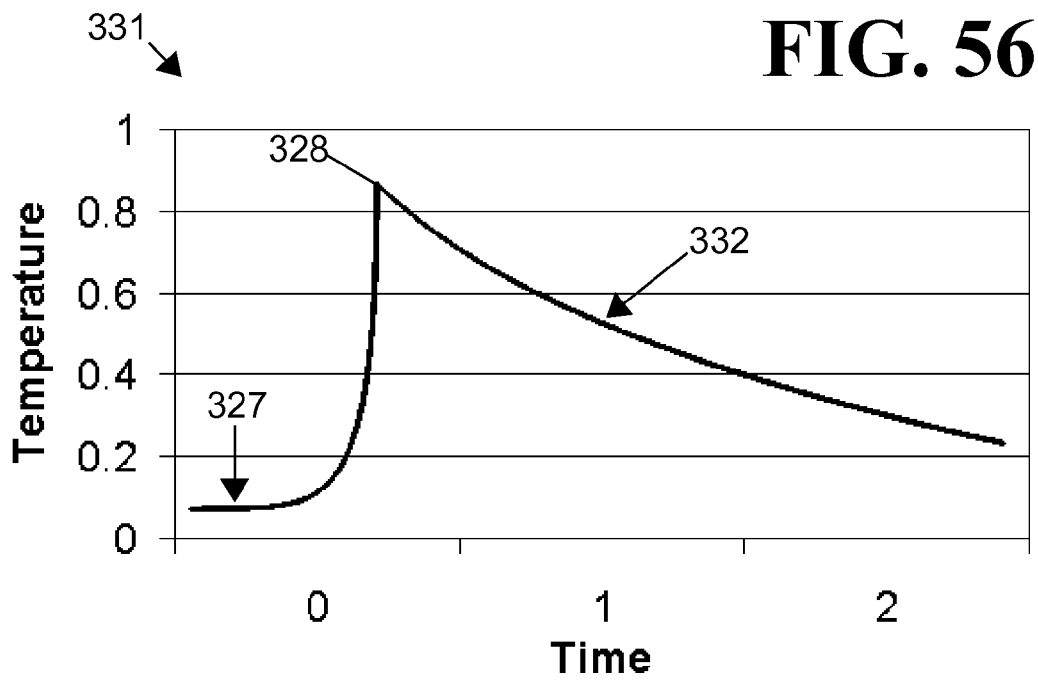
FIG. 56 is a sample response curve of a temperature monitor in a slow moving solution stream.
Figure 57:
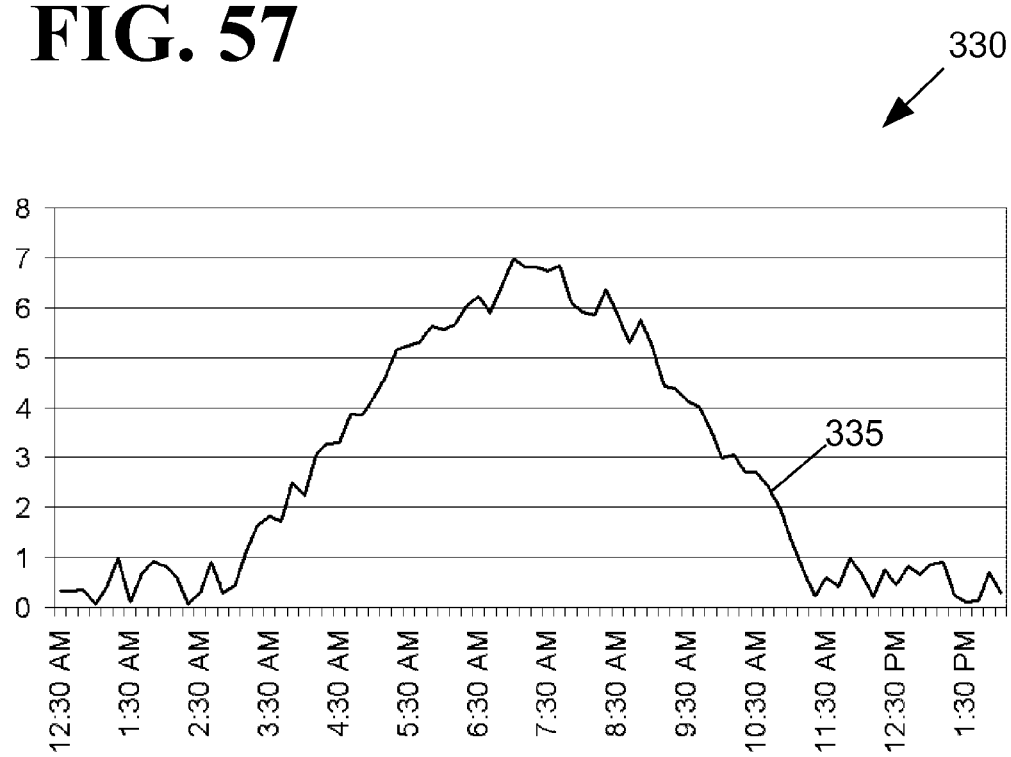
FIG. 57 is a chart showing data collected from a data acquisition device.

FIGS. 55 and 56 show sample temperature response curves for fast moving and slow moving solutions, respectively. In both the fast moving solution measurement 326 and the slow moving solution measurement 331, the ambient temperature measured during the ambient temperature/initial stage 327 before the heat source is engaged. Some time after the heat source is engaged, the heat sensor reaches a set point 328 that causes the heat source to be disengaged. Depending on the configuration used, the time duration needed to reach the set point could be on the order of milliseconds. Following the disengagement of the heat source, a relative rapid cool down period 329 occurs when the sensor is submersed in a quickly moving solution. The rate of temperature change is indicative of a velocity of the fluid flow. When the solution is flowing slowly, a temperature increase in the solution near the heat sensor 321 decreases the rate of heat transfer to the solution and causes a relatively slow cool down 332 of the heat sensor.

FIG. 54 is a single function data chart 330 showing recorded data 335 collected by a single monitoring device as a function of time. In FIG. 54, a rain event occurred between 1:30 AM and 5:30 AM that caused an increase in the flow rate through the sewer between 2:30 AM and 11:30 AM. In the preferred embodiment of the invention, the data is collected at 5 minute intervals in order to reduce data acquisition device power consumption.

Figure 58:
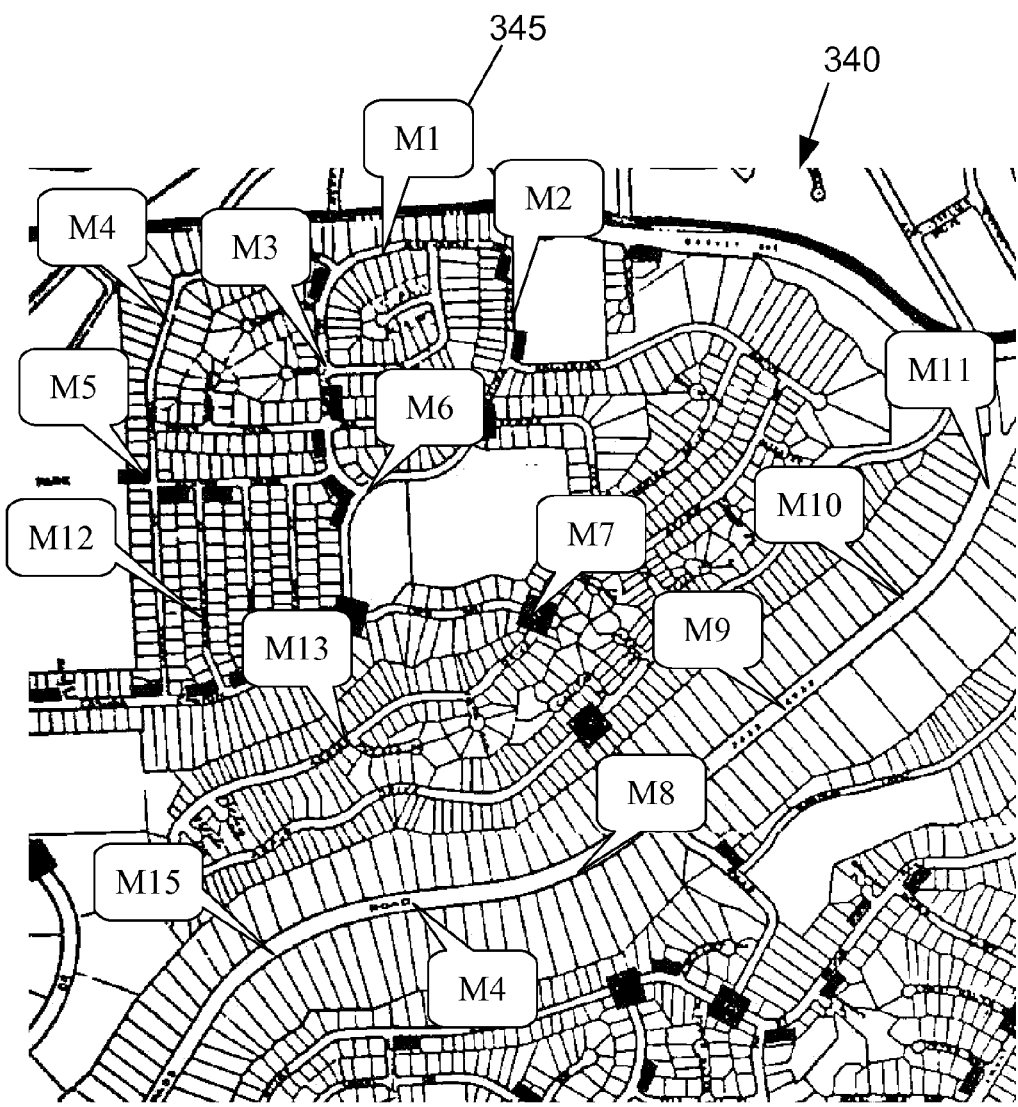
FIG. 58 is a street map showing the positioning of multiple monitoring devices in a city sewer system.

The low cost and ease of use of the present invention facilitates the usage of multiple monitoring devices over a wide area in order to gain a better understanding of the flow rate through the sewer systems. FIG. 58 shows a street map 340 with markers 345 showing the hypothetical placement of multiple monitoring devices placed on a street map. Positioning monitoring devices in close proximity to each other reduces the length of sewer pipe that must be search when a blockage or inflow between the devices is identified.

Recent developments in satellite, mapping and computer technology have led to the increased availability of precise geographic maps and data on the internet. Highly accurate and detailed street and topographic maps, as well as aerial satellite photographs, are now readily available on the internet for nearly every location in the United States and many populated areas throughout the world. This information and data, however, has not yet been effectively utilized in the study and analysis of waste and storm water conveyance systems.

Sanitary sewer system authorities also maintain maps of their sanitary and storm water sewer systems. These maps, which detail all piping and access points, are the first step in analyzing any sewer system. If a digitized computer file of the system map is not available, one may be created from a paper copy of the map.

Once a sewer system map has been obtained from the system authority and the topographical map, street map and aerial photograph of the same area have been obtained, the maps may be combined using commercially available mapping software. By identifying a particular point on each map or photograph with the same precise latitude and longitude, the maps and aerial photograph may be precisely aligned with one another.

Figure 59:
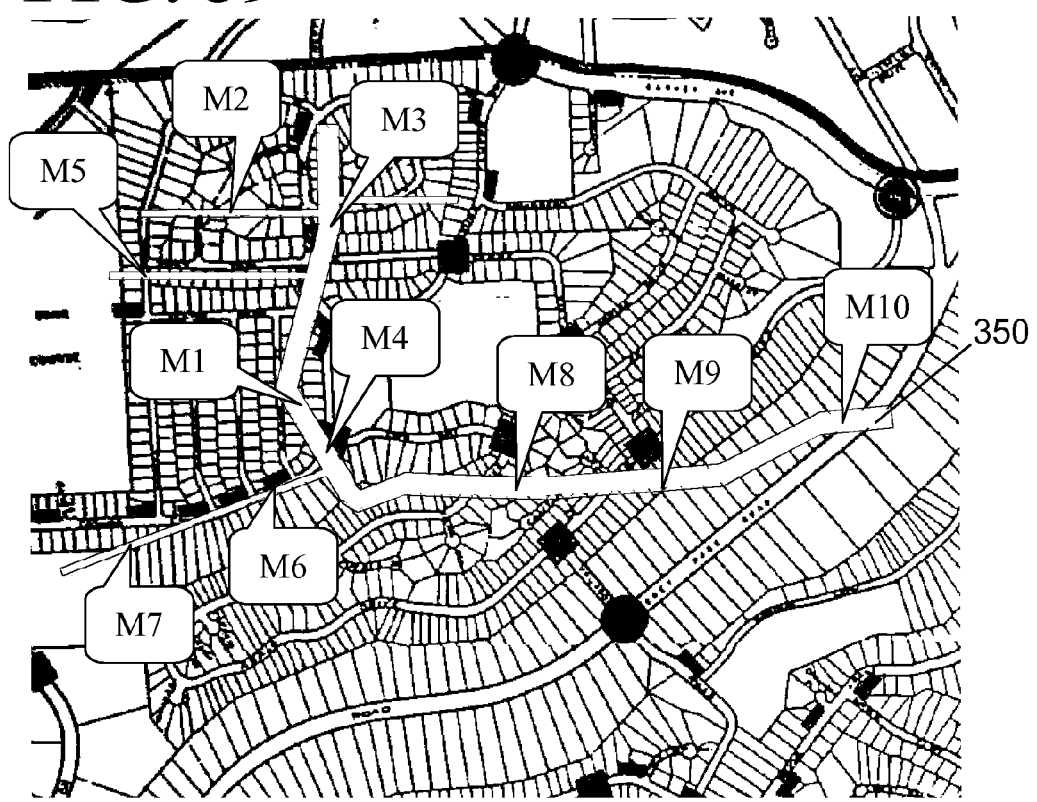
FIG. 59 is a street map with a sewer overlay showing the positioning of multiple monitoring devices in a city sewer system.

FIG. 59 is the street map shown in FIG. 58 with the addition of a sanitary sewer system overlay 350. In addition to overlaying a sewer system onto a street map, representations of sewer systems may also be overlaid onto aerial or satellite photography. These maps may be downloaded from the internet by identifying the geographic location by name or by identifying the latitude and longitude for which a map is desired.

Figure 60:
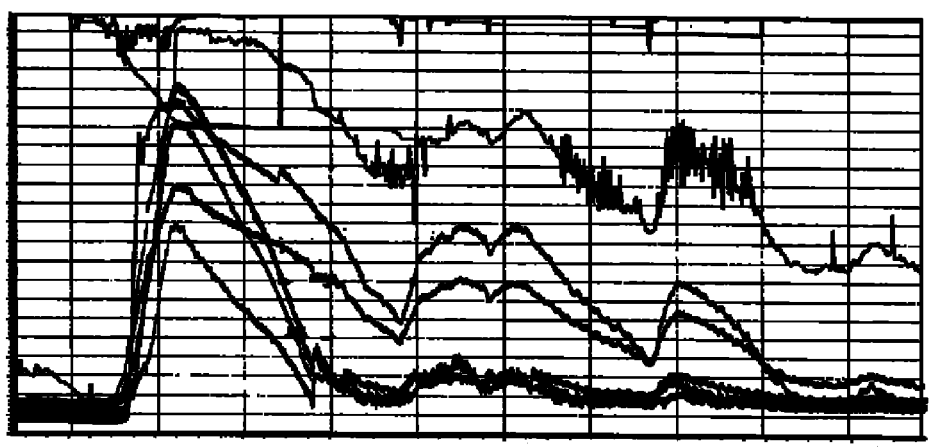
FIG. 60 is a chart showing data collected from multiple monitoring devices in a city sewer system.
Figure 61:
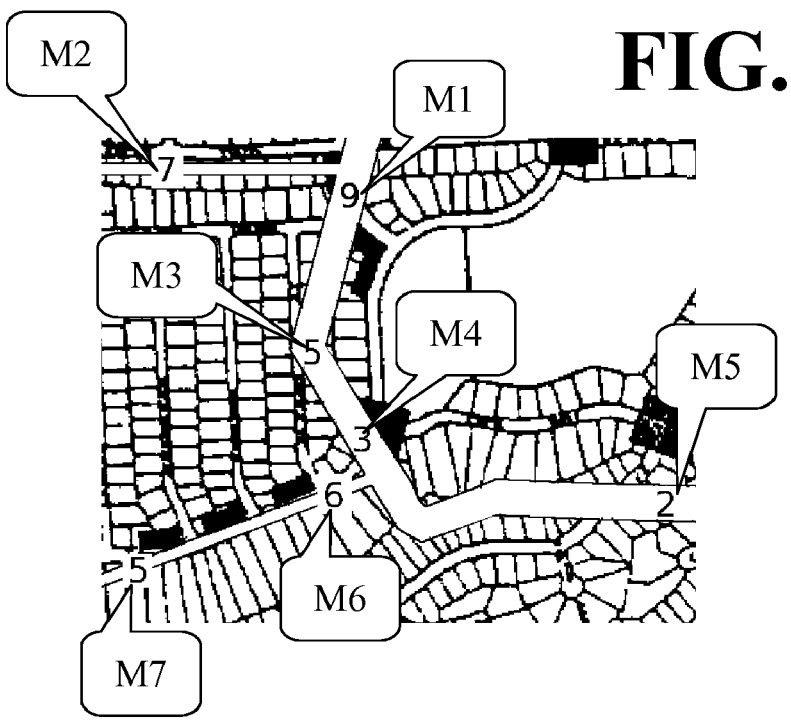
FIG. 61 is a street map with a sewer overlay, a flow overlay represented by numbers, and markers that show the positions of multiple monitoring devices in a city sewer system.
Figure 62:
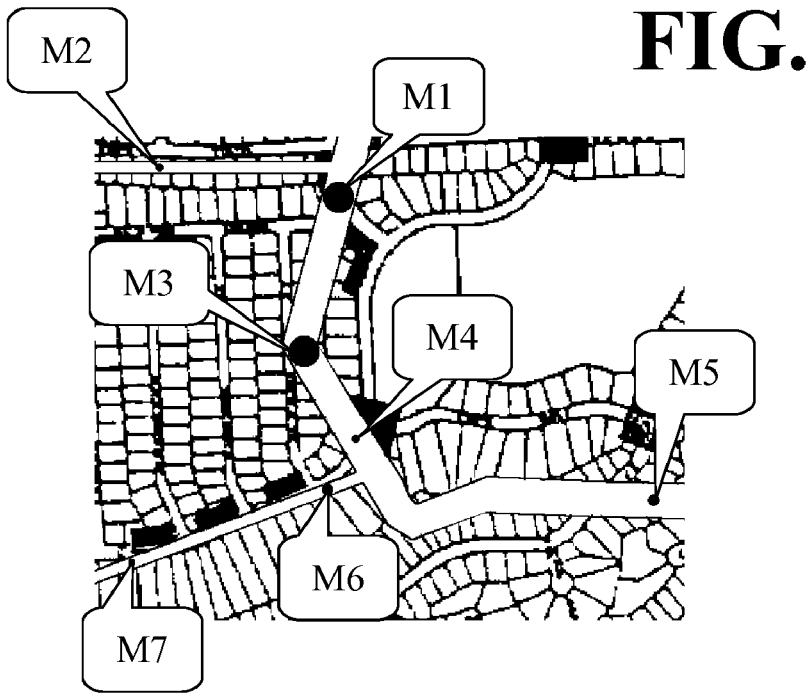
FIG. 62 is a street map with a sewer overlay, a flow overlay represented by symbols, and markers that show the positions of multiple monitoring devices in a city sewer system.
Figure 63:
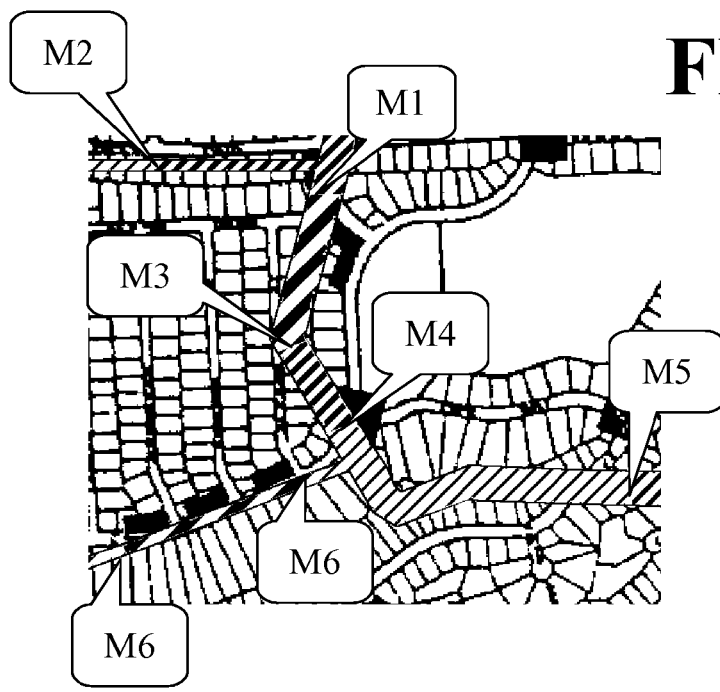
FIG. 63 is a street map with a sewer overlay, a flow overlay represented by textures between monitoring devices, and markers that show the positions of multiple monitoring devices in a city sewer system.
Figure 64:
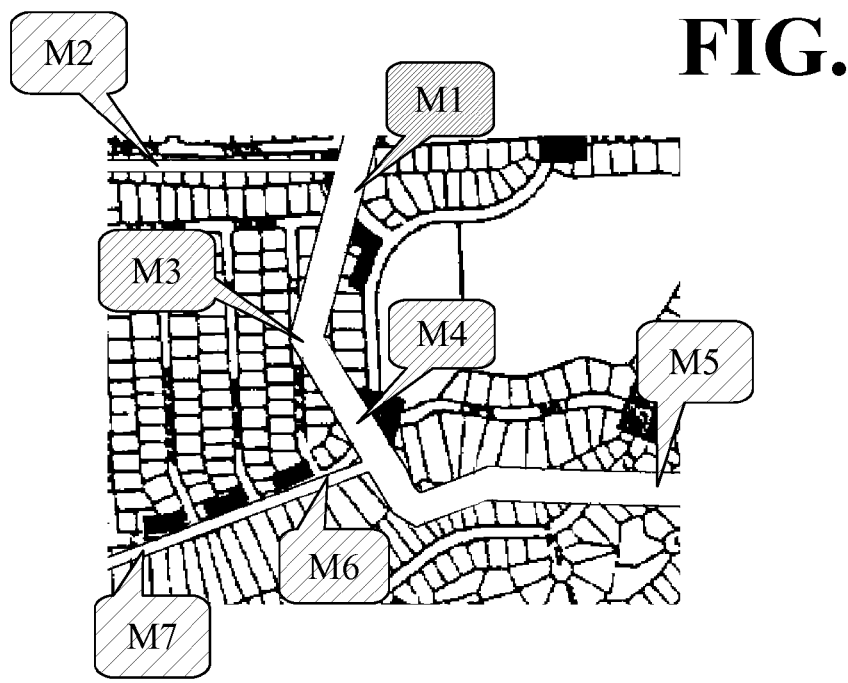
FIG. 64 is a street map with a sewer overlay and monitoring device indicators that show the position and flow rate at multiple monitoring devices.

FIG. 60 shows the data read out from some of the data monitoring devices of FIG. 59. In addition to outputting the data collected onto a chart. Computer software may be used to represent some of the data in FIG. 56 in an overlay on the map of FIG. 59. Methods of representing the flow rates at various times may include using colors, numbers as shown in FIG. 61, or symbols as shown in FIG. 62. Differences in flow rates between monitoring devices may also be represented as colors, numbers, symbols, or cross hatching as shown in FIG. 63. Measured flow data may be overlaid on a variety of places such as the location of the monitoring devices, as seen in FIGS. 61 and 62, between the monitoring devices as shown in FIG. 63, or on the monitoring device markers as shown in FIG. 64. Flow rate derivatives may be represented on charts showing the change in flow rates. Information related to the integrated flow rate may be shown to illustrate the total volume of liquid passing through the sewer system in a given time.

Figure 65:
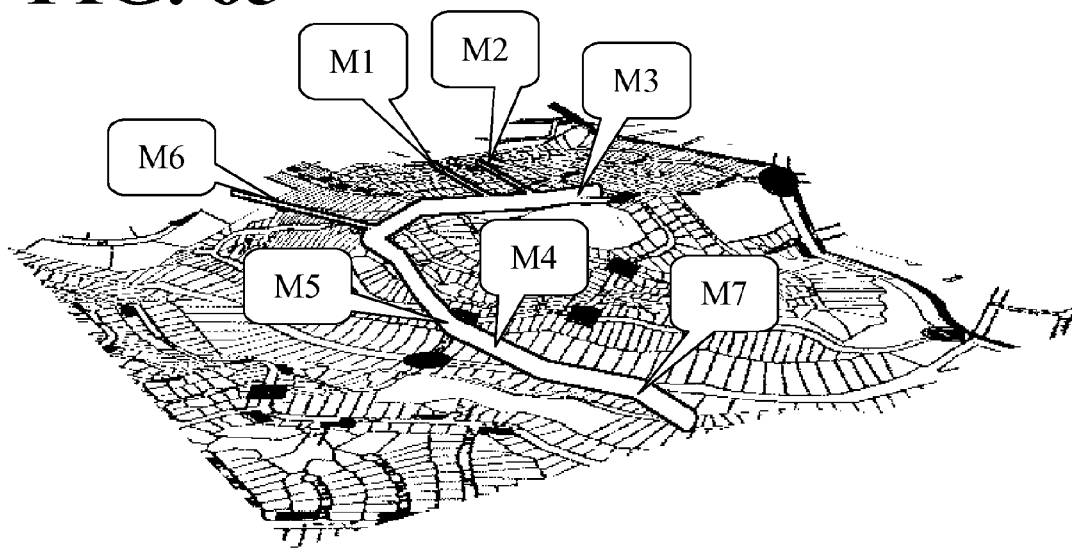
FIG. 65 is a three dimensional map showing the topography of a city, a street map, a sewer overlay, and the position of multiple monitoring devices.
Figure 66:
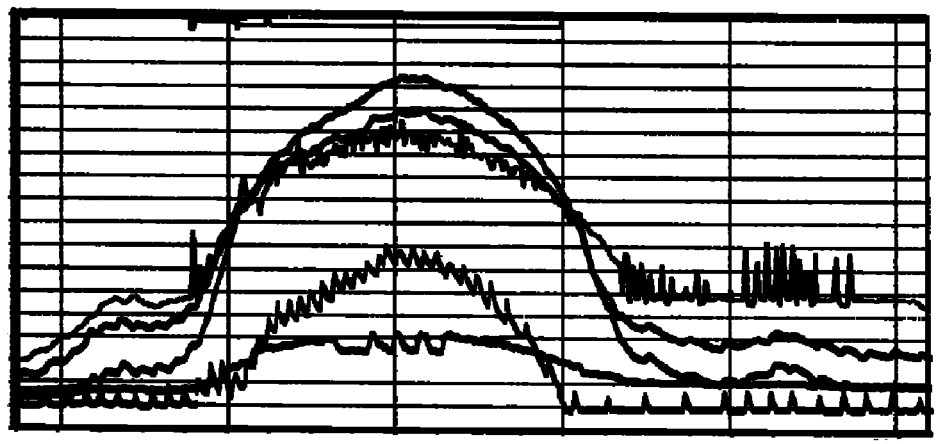
FIG. 66 is a street map with sanitary and storm sewer overlays.

Mapping software may be used to convert the topographical map to a three dimensional image of the geographic area under study. The mapping software may also be used to overlay the sewer system piping, the street map and/or the aerial photograph (or some combination thereof) on the three dimensional image, as represented in FIG. 65. The resulting data, shown in FIG. 66, may then be studied.

The geographic features of the area under study may be evaluated from the three dimensional image. The aerial photograph of the area may be overlaid on the three dimensional image to show the ground cover and other geographic features (including existing waterways) that might influence storm water runoff during wet weather. In particular, troughs, valleys and depressions in the three dimensional image may be identified as potential sources for the collection of storm water. Once these locations are identified and the course of significant storm water runoff is predicted, the sanitary sewer system map may be overlaid on the three dimensional image and the sections of piping located at these storm water collection points identified. By overlaying the street map, the precise location of these potential infiltration and inflow points may be further specified.

By identifying potential infiltration and inflow points using this method, any inspection or flow measurement study may be concentrated on those areas immediately adjacent (upstream and downstream) to where infiltration and inflow is most likely. Thus, rather than studying the entire system, or dispersing flow measurement devices and personnel throughout the system, the study may be concentrated in a particular area or areas. This advance analysis leads to cost and time savings in both equipment and personnel, and allows the sewer system authority to proceed to the next step of closer inspection and analysis with greater confidence.

Multiple sewer systems, such as sanitary sewers 350 and storm sewers 355, may be overlaid onto topographic and street maps as shown in FIG. 63. Methods of differentiating between overlaid sewer systems include the use of hatching, multiple colors, and textures. In addition to overlaying sewer systems onto a street map, three dimensional representations of multiple sewer systems, as shown in FIG. 64, may be used in the study of the sewer systems.

Figure 69:
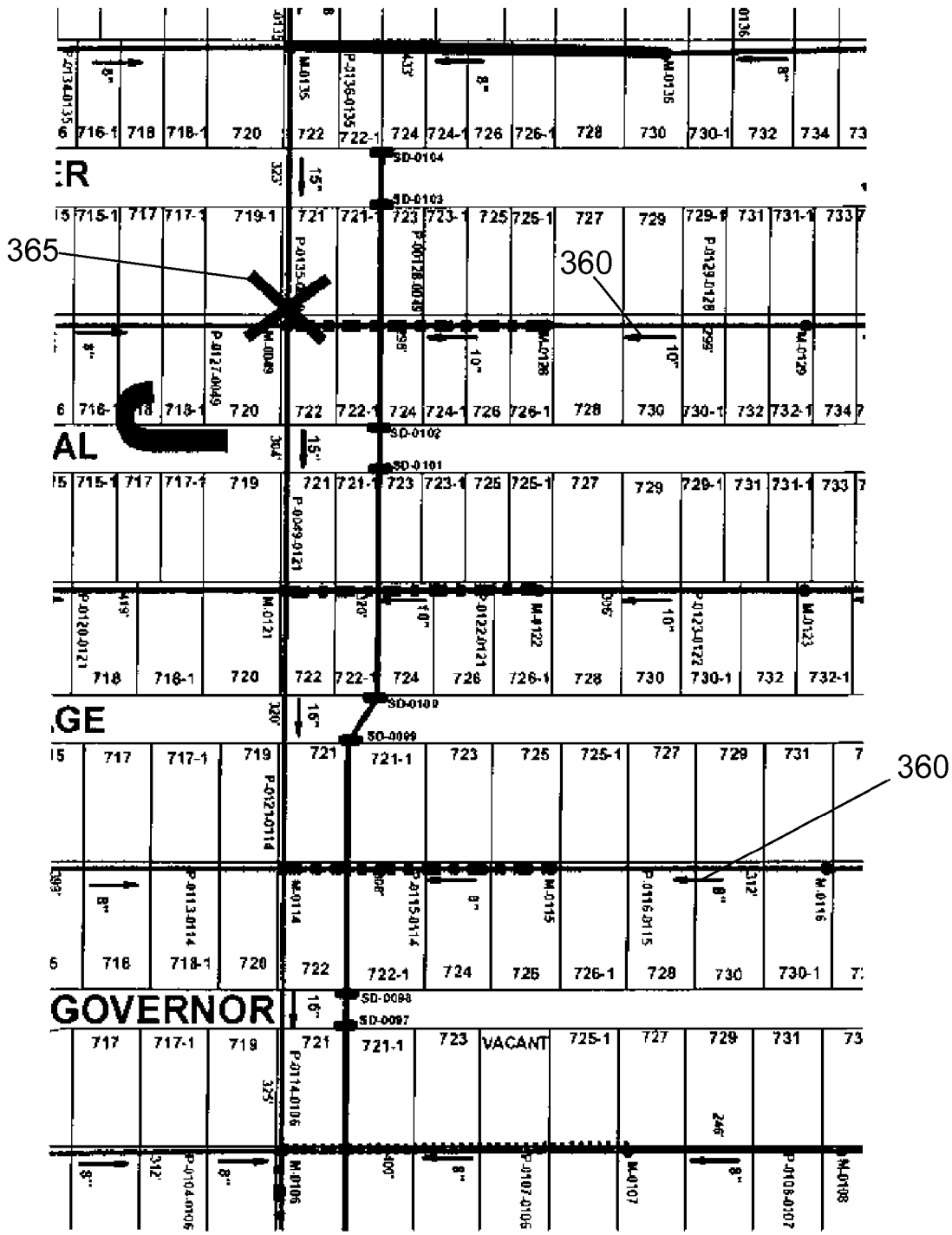
FIG. 69 is an image of a data analysis tool illustrating the street location of four flow monitors, a portion of the data recorded by the flow monitors over a period of time illustrated as ribbons, and a chart highlighting the portion of the data illustrated by the ribbons.

FIG. 69 shows an alternative embodiment of the invention where the sewer system is represented by bold lines, the flow direction indicators 360 illustrate the directions of flow, and x-symbols 365 show the location of a sewer blockage.

Figure 70:
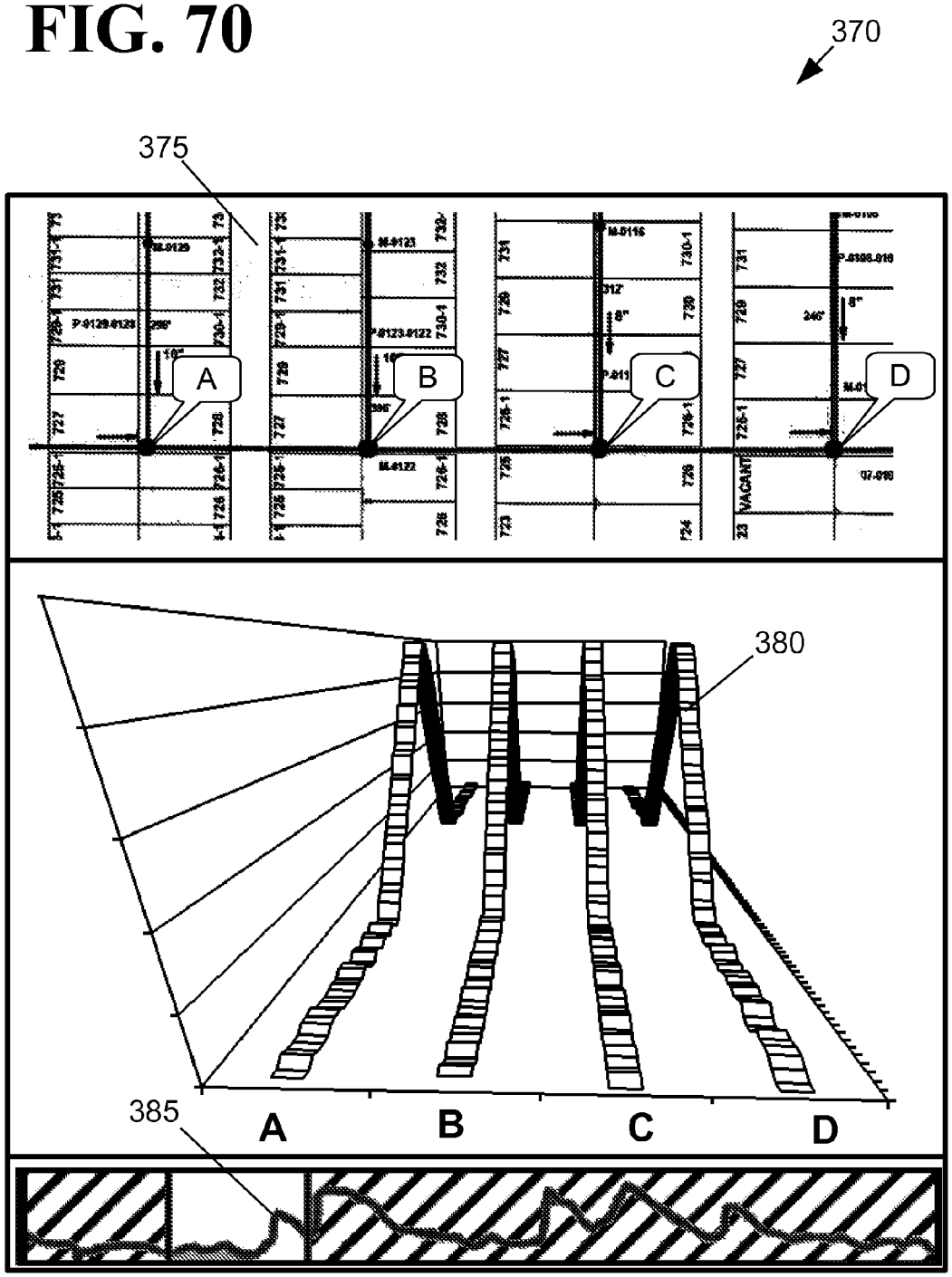
FIG. 70 is an image of a data analysis tool indicating an increase in flow at monitor C before an increase in flow at monitor A, B, and D.

FIG. 70 shows a data analysis tool 370 displaying a street map 375 with four flow monitors. A portion of the data collected by the flow monitors is illustrated as ribbons 380. Each ribbon corresponds to a flow monitor, time is represented on the y-axis or floor of the graph, and the numerical values of the data collected (fluid level, pressure, flow rate, etc.) are represented on the z-axis or walls of the chart. Shown below the ribbons is a line graph 385 representing all the data collected by the monitors, or the data collected by another monitor (such as the flow rate into a water treatment facility). The time period represented by the ribbon chart is highlighted on the line graph as the area without cross-hatching. The increase in flow at a certain time is indicative of a rain event. In the data analysis tool shown in FIG. 70, the data recorded by the four flow monitors is substantially similar indicating the sewer is operating properly.

The time duration displayed by the ribbon chart may be increased to better illustrate long term trends or shortened to highlight key monitoring times such as immediately before, during, and after a rain event. Although only one variable is shown on the z-axis, multiple sets of data may be over laid for a single monitor. For example, pressure and tilt may be displayed on a single chart with pressure data offset from the tilt data for clarity.

Figure 71:
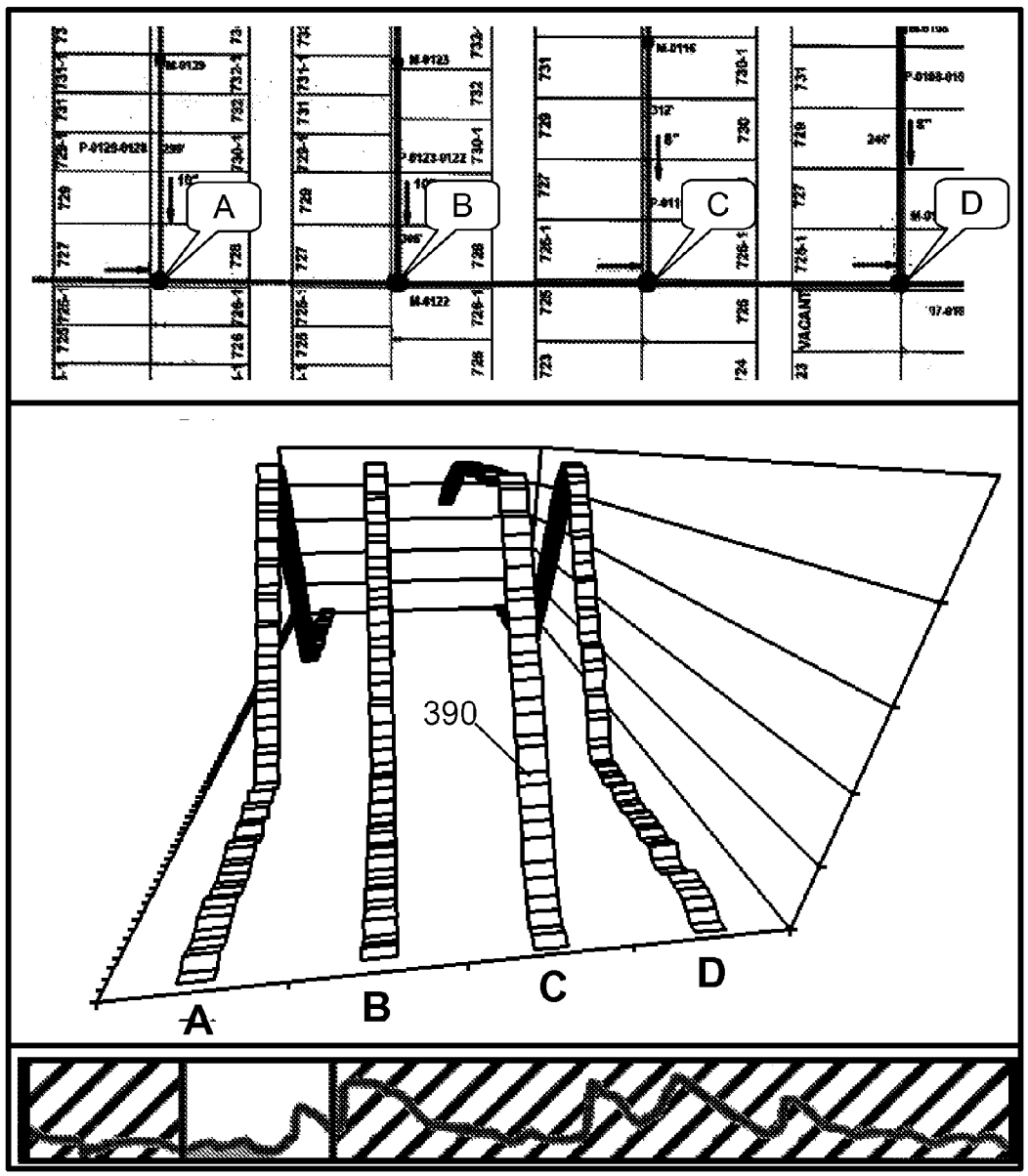
FIG. 71 is an image of a data analysis tool indicating an increase in flow at monitor D before an increase in flow at monitor A, B, and C.

FIG. 71 shows a data analysis tool substantially similar to the tool shown in FIG. 70. Flow monitors A, B, and D indicate substantially similar relative fluid levels, while monitor C 390 indicates an increase in fluid level before the other monitors. Additionally, the fluid level recorded at monitor C remains elevated after the other monitors return to pre-rain event fluid levels. The early increases of the fluid levels at monitor C and the lengthened return to pre-rain event levels are indicative of a problem in the sewer system.

Figure 72:
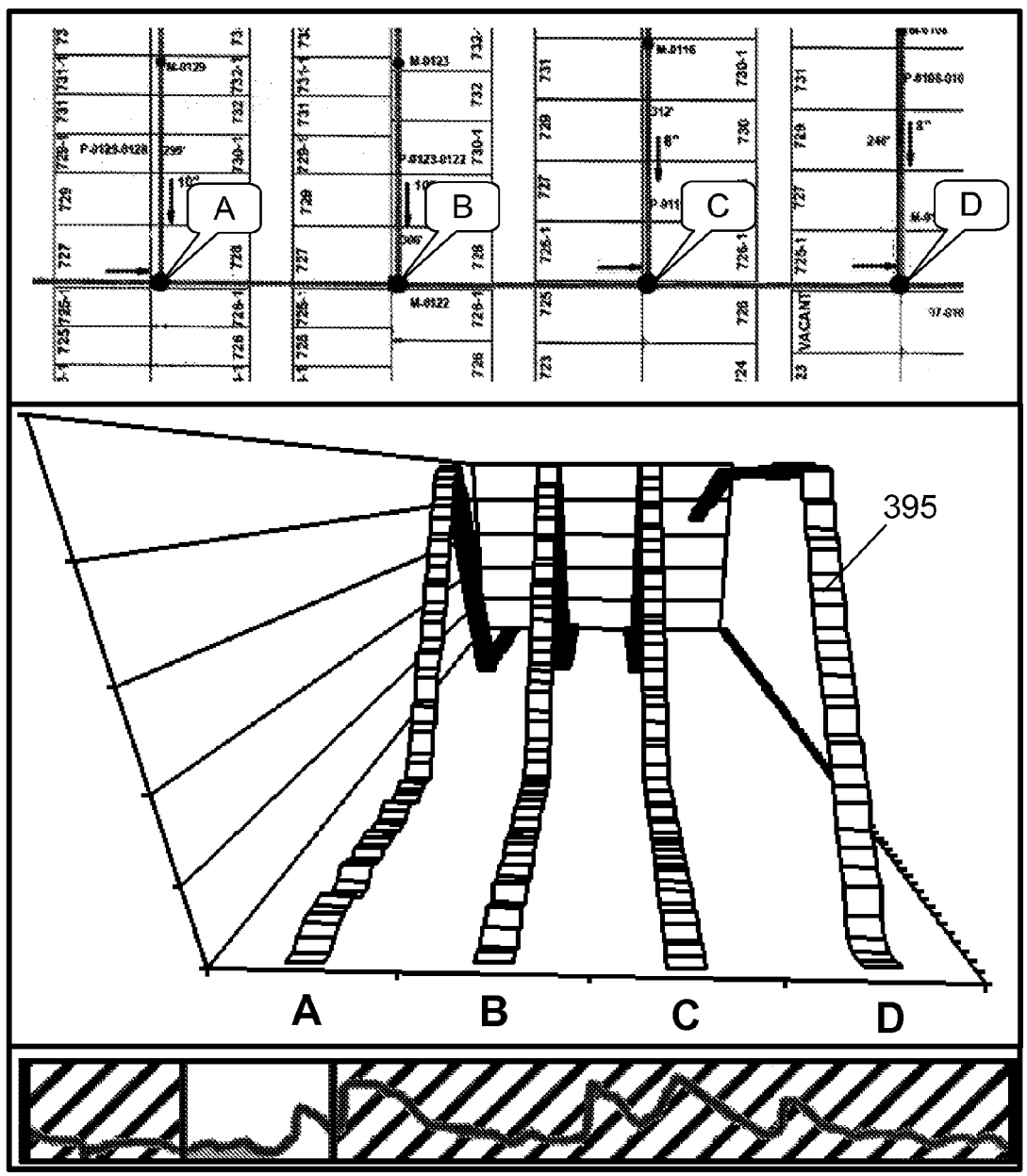
FIG. 72 is an image of a data analysis tool illustrating the street location of four flow monitors, a portion of the data recorded by the flow monitors over a period of time illustrated as a 3D area chart, and a chart highlighting the portion of the data illustrated by the 3D area chart.

FIG. 72 is substantially similar to FIG. 71 except that a problem in the sewer system is indicated by monitor D 395 instead of monitor C.

Figure 73:
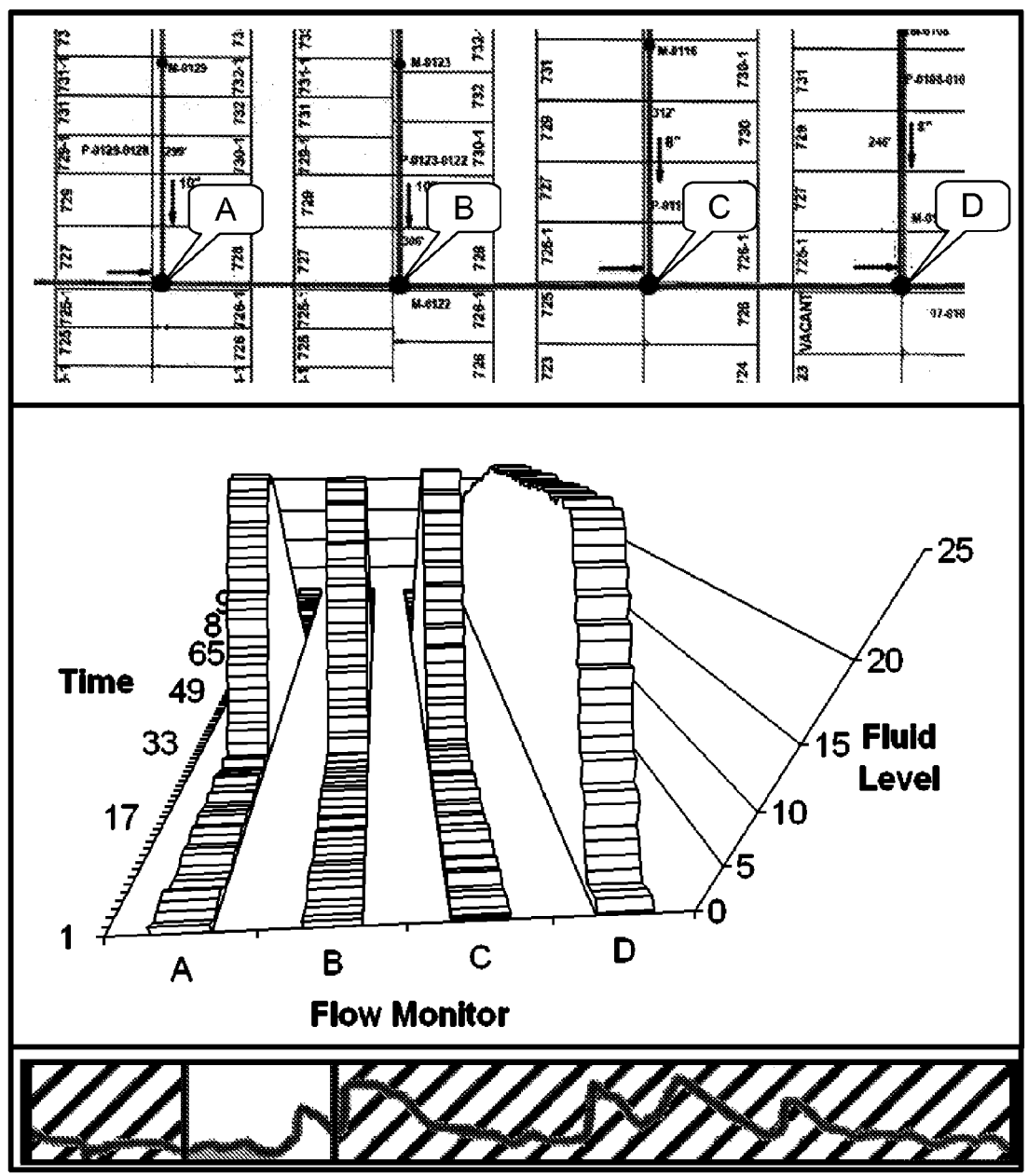
FIG. 73 is an image of a data analysis tool illustrating the a portion of the data (z-axis) recorded by numerous monitors (x-axis) over a period of time (y-axis) as a ribbons, and a chart highlighting the portion of the data illustrated by the ribbons.

FIG. 73 shows the same data as in FIG. 62 except that the data is represented by 3D area charts instead of ribbons. Additionally the axes are labeled with time, flow monitor, and fluid level.

Figure 74:
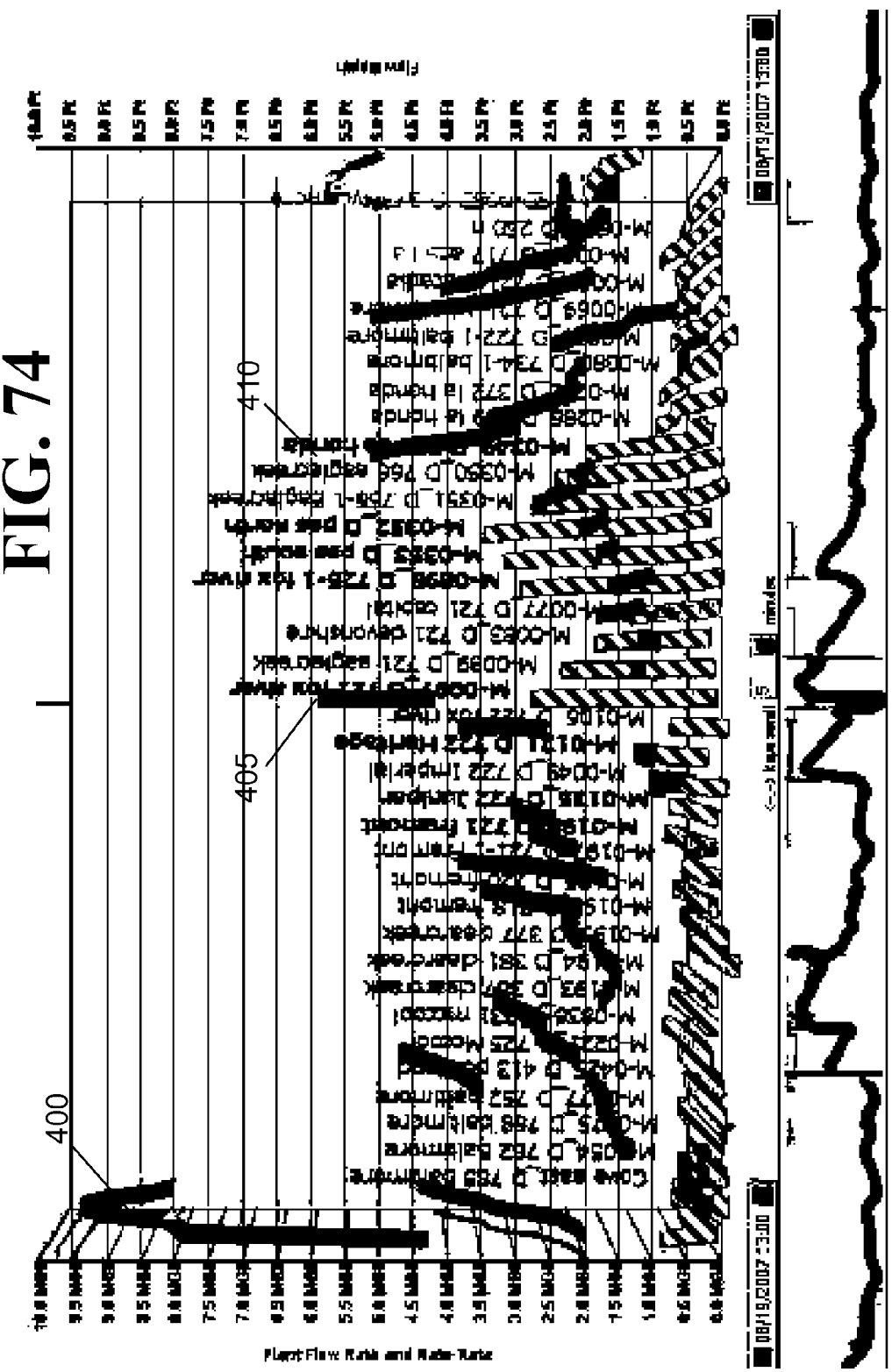
FIG. 74 is an image of a data analysis tool illustrating the a portion of the data (z-axis) recorded by numerous monitors (y-axis) over a period of time (x-axis) as a ribbons, and a chart highlighting the portion of the data illustrated by the ribbons.
Figure 75:
FIG. 75 is an image of a data analysis tool showing a portion of the data recorded by four flow monitors over a period of time illustrated as a 3D area chart and overlaid on a street map, and a chart highlighting the portion of the data illustrated by the 3D area chart.

FIGS. 74 and 75 show the data collected from over 35 fluid monitors during a rain event. The fluid level and flow rate data for each monitor are illustrated on the z-axes of the charts. FIG. 74 displays time on the y-axis, while FIG. 75 displays time on the x-axis. With over 35 fluid monitors, the clarity of the data is significantly enhanced by displaying time on the y-axis. In addition to the data collected from the sewer flow monitors, the sewer treatment plant flow rate 400 is also displayed on the left side of the chart in FIG. 74. As with the other examples of the data analysis tool, only a portion of the data collected is displayed to better highlight key monitoring times. A strip chart showing data from the entire monitoring period is displayed below the ribbon chart. In this example of the invention, the representative data is collected at the sewer treatment plant.

In FIG. 74, a cluster of fluid monitors show an early increased flow rate (M-009 D721 fox river 405 through M-0349 D 333 La Honda 410). A clustering of early rising fluid levels is indicative of a problem in the sewer system. The problem is not necessarily near the clustering of early rising monitors and blockage significantly downstream may be responsible.

Figure 76:
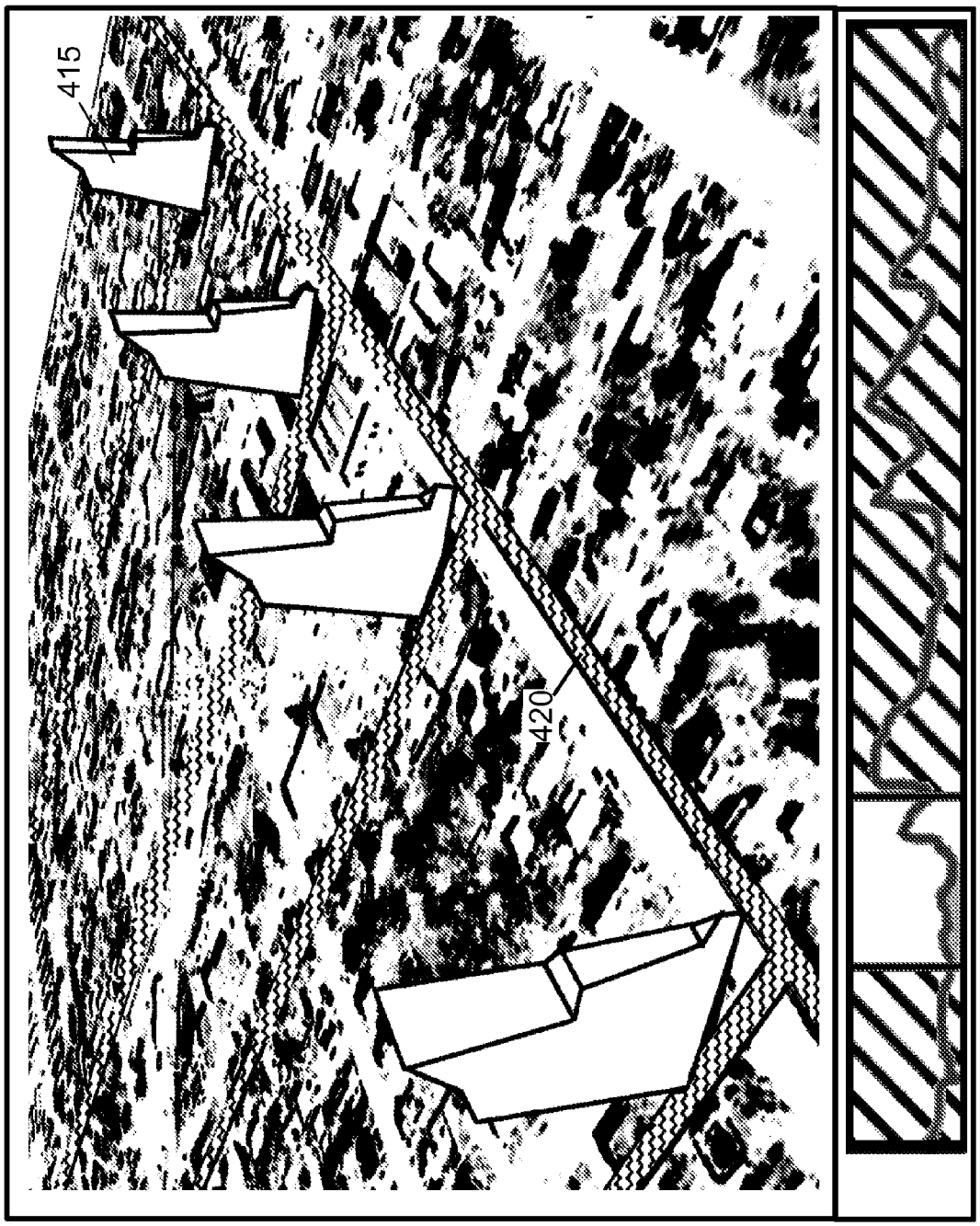
FIG. 76 is an image of a data analysis tool showing a portion of the data recorded by four flow monitors indicating an uneven flow rate at one of the monitors.
Figure 77:
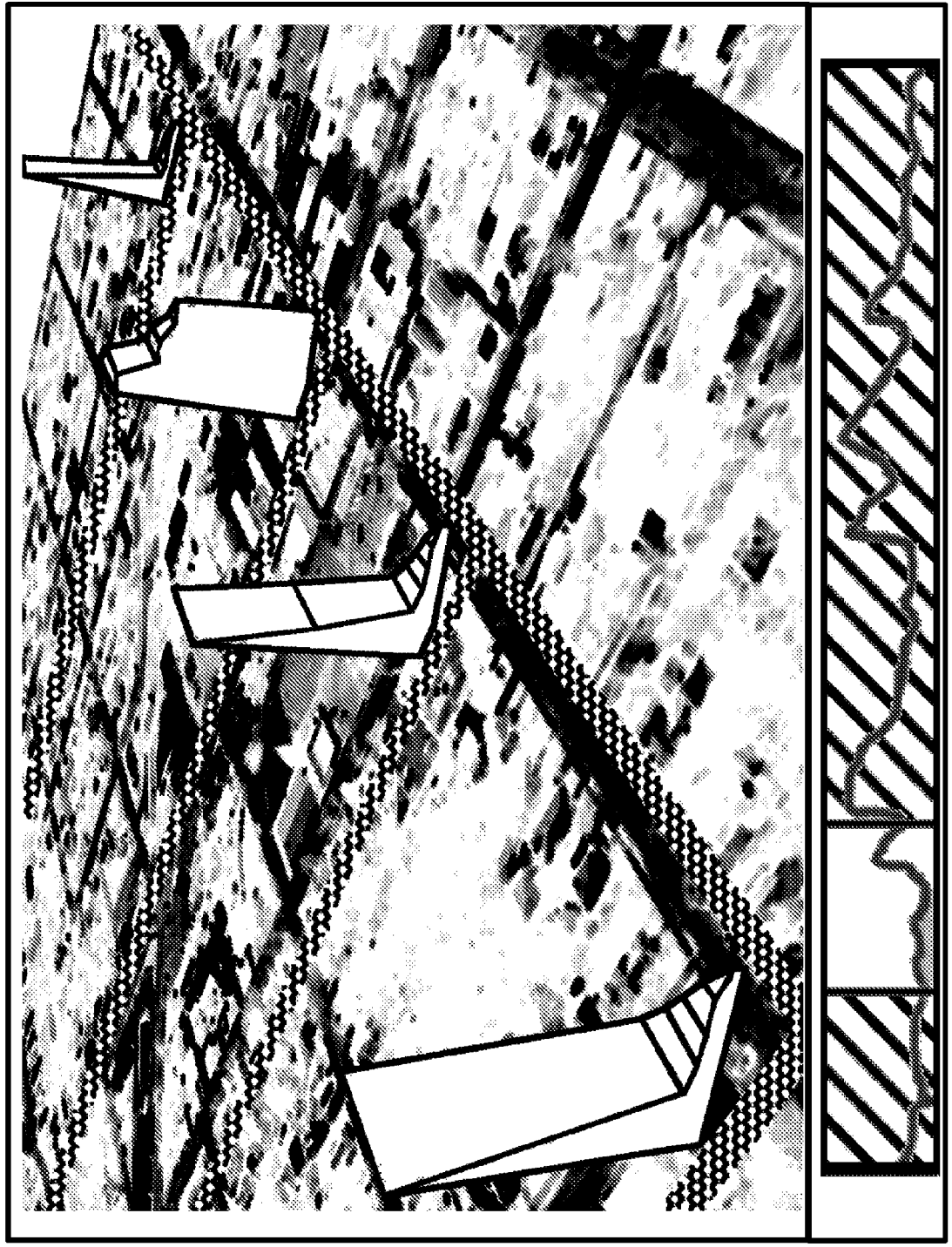
FIG. 77 is a flow diagram illustrating a process for maintaining the integrity of a sewer system.

FIGS. 76 and 77 present data similar to the data presented in FIG. 70, except that the collected data is presented as 3D overlays 415 (similar to those shown in FIG. 69) onto a 3D street map. The presentation of the data as an overlay may be beneficial in identifying problem locations in complex and highly interconnected drainage systems. FIG. 76 shows substantially similar data from four monitors which suggests that the displayed portion of the sewer system 420 is functioning properly. FIG. 77 shows three monitors with substantially similar data and one monitor with a significant early increase in fluid level. Such a result is indicative of a flow restriction between the two monitors on the right portion of the figure. Alternatively inflow and infiltration between the middle two monitors could result in an early increase in fluid level.

Figure 78:
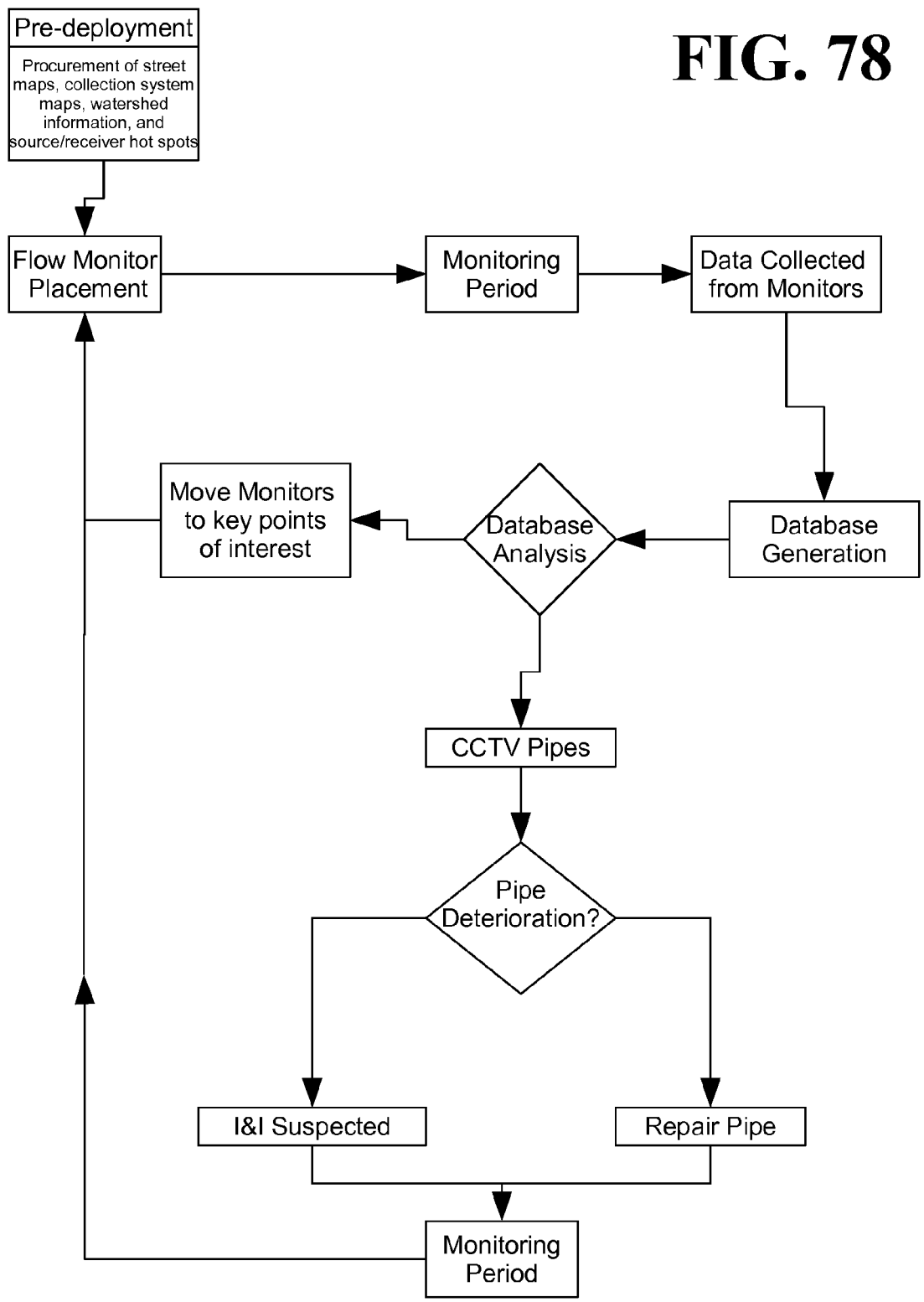
FIG. 78 shows a flow chart for monitoring and maintaining the integrity and operability of a sewer system.

FIG. 78 illustrates a flow chart for monitoring and maintaining the integrity and operability of a sewer system. In a pre-deployment phase 425, information is gathered on the sewer system (such as maps), the watershed (rivers, topography, etc.), and hot spots (where previous work has been done, previous overflows, etc). The collected data is then analyzed to determine locations for the initial placement of the monitors. Pre-deployment analysis increases the likelihood of the initial placement of flow monitors yielding actionable data.

After the initial placement of the monitors, data is collected. In one embodiment of the invention, monitors are placed in 5%-10% of the manholes in a sewer collection system. The monitoring period may be a specified time (30 days, 2 months, etc.), or it may be until a predetermined rain event has occurred such as 0.5 inches of rainfall in less than 6 hours.

After the monitoring period, data is collected from the monitoring devices and synthesized into a database and analyzed in the manners previously disclosed. If there is a strong indication of a problem in a specific location, closed circuit television (CCTV) analysis of the pipe may be performed in order to further test the pipe. If pipe deterioration is observed, the pipe may be repaired. If there is a strong indication of a problem and pipe deterioration is not observed, it is indicative of inflow and infiltration (I&I). After repairing the pipe (or if I&I is suspected), the location is further monitored.

When there is an indication of a problem in the sewer system, but not a strong enough indication to warrant CCTV analysis of the pipes, the flow monitors may be clustered around key points of interest to support or refute the suggestion of a problem.

In one embodiment of the method disclosed in FIG. 77, a large number of flow monitors are used to collect a large amount of data in a brief period of time. For example, a large number of monitors may be used when the cause of a known problem needs to be found. With a sufficient number of flow monitors, repositioning of the monitors for a second monitoring period may not be necessary. Alternatively, in another embodiment of the method of FIG. 78, a relatively small number of flow monitors may be used on a continual basis to analyze the operability of a sewer system.

While the principles of the invention have been shown and described in connection with specific embodiments, it is to be understood that such embodiments are by way of example and are not limiting. Consequently, variations and modifications commensurate with the above teachings, and with the skill and knowledge of the relevant art, are within the scope of the present invention. The embodiments described herein are intended to illustrate best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A fluid flow monitoring and analysis device structured for monitoring a fluid flow rate within a community sanitary or storm sewer collection network, the fluid flow monitoring and analysis device being removeably secured proximate to a manhole opening in the community sewer collection network, the fluid flow monitoring and analysis device comprising:
   a fastening mechanism secured proximate to the manhole opening in the sewer collection network;
   a rigid pole attached to the fastening mechanism;
   a flexible shaft moveable by the fluid flow, the flexible shaft including
      a stationary end fixedly attached to the rigid pole and
      a mobile end submerged in the fluid flow; and
   a data acquisition device disposed in the mobile end of the flexible shaft, the data acquisition device including
      an accelerometer for producing a tilt signal corresponding to an orientation of the accelerometer,
      a pressure sensor for producing a pressure signal corresponding to a fluid pressure exerted upon the pressure sensor,
      a data storage device for receiving and recording the pressure signal and tilt signal, and
      a data transmission device for transmitting the pressure signal and the tilt signal to a data reader.

2. The fluid flow monitoring and analysis device of claim 1 further comprising:
   the flexible shaft including a hollow core extending from the mobile end to the stationary end, the hollow core including a first diameter at the mobile end of the flexible shaft;
   a cylindrical waterproof compartment circumscribed about and encapsulating the data acquisition device, a threaded end proximate to the mobile end of the flexible shaft;
   an end cap with
      a threaded section cooperating with the threaded end,
      a pressure orifice distant from the threaded section, and
      a tapered surface extending between the threaded section and the pressure orifice;
   a hydrophobic fluid enclosed in a pressure tube, the hydrophobic fluid
      contacting the fluid flow,
      extending to the pressure orifice, and
      exerting a force upon the pressure sensor of the data acquisition device.

3. The fluid flow monitoring and analysis device of claim 1 wherein
   the data transmission device includes a wireless transmission component for wirelessly transmitting the pressure signal and the tilt signal to the data reader.

4. The fluid flow monitoring and analysis device of claim 1 wherein
the fastening mechanism includes
an extendable and retractable mobile rod with a rod cap structure, in an extended position, to contact the community sewer collection network at the manhole opening, and
a locking portion for maintaining the mobile rod in the extended position.

5. The fluid flow monitoring and analysis device of claim 4 further comprising:
a screw-type positioning mechanism in the mobile rod for adjusting the length of the mobile rod,
a pivot point in the mobile rod, and
a cushion connected to the rod cap.

6. The fluid flow monitoring and analysis device of claim 1 further comprising:
the fastening mechanism being secured to the rigid pole by a clamping device operable by a rotatable knob.

7. A fluid monitor for monitoring and measuring a fluid flow level and velocity within a sewer collection network, the fluid monitor comprising:
a flexible shaft with an anchored end and a mobile end, the mobile end moving in response to the fluid flow level and velocity; and
a data acquisition device disposed in the mobile end of the flexible shaft, the data acquisition device including
an accelerometer generating an acceleration signal in response to a stimulus selected from a group consisting of movement of the data acquisition device and orientation of the data acquisition device;
a data storage device for receiving and recording the acceleration signal;
a front compartment casing including
a first outer surface of greater circumference proximate to the mobile end of the flexible shaft,
a second outer surface of lesser circumference contacting an interior surface of the flexible shaft, and
a front face with a tube orifice, the front face extending from the first outer surface;
a pressure sensor detecting a pressure on the data acquisition device, the pressure sensor generating a pressure signal;
a pressure tube
passing through the tube orifice,
connecting to the pressure sensor, and
contacting the fluid flow; and
a hydrophobic fluid within the pressure tube;
the data storage device both receiving and recording the pressure signal.

8. The fluid monitor of claim 7 further comprising:
an inductively chargeable battery providing power to the data acquisition device; and
a linear generator moved by the fluid flow and providing power to the data acquisition device.

9. The fluid monitor of claim 7 further comprising:
a pole with
a top portion near a manhole accessing opening of the sewer collection network, and
a bottom portion, the bottom portion secured to the anchored end of the flexible shaft.

10. The fluid monitor of claim 9 further comprising:
the pole being attached to an expansion device secured to the manhole access opening, the expansion device including
an extendable and retractable mobile post with a post cap adapted to, in the extended position, contact the manhole access opening, and
a locking portion for maintaining the mobile post in the extended position.

11. The fluid monitor of claim 10 with the mobile shaft further comprising:
a screw-type positioning mechanism in the mobile post for adjusting the length of the mobile post,
a pivot point between the post cap and the locking portion, and
a compressible cushion in the post cap.

12. The fluid monitor of claim 10 further comprising:
a clamping device operated by a tension knob, the clamping device securing the expansion device to the pole.

13. The fluid monitor of claim 7 further comprising:
a battery providing power to the data acquisition device; and
a wireless transmission component for transferring the acceleration signal to a data reader.

14. The fluid monitor of claim 7 further comprising the mobile end of the flexible shaft further including
a plurality of thermal flow sensors both embedded in the mobile end and radially disposed about the data acquisition device, each thermal flow sensor including
a heat source thermally connected to a heat sensor in thermal communication with the fluid flow,
the heat sensor measuring a temperature
during an ambient temperature period and
during a cool down period where a rate of temperature change is indicative of a velocity of the fluid flow.

15. A method of using the fluid monitor of claim 7 comprising:
positioning the mobile end of the fluid monitor in the fluid flow before a rain event;
recording the acceleration signal to the data storage device before, during, and after a rain event; and
transferring the accelerometer signal from the data storage device to a computer readable medium.

16. A fluid monitoring system for monitoring a sewer system fluid flow within a manhole of a community sewer collection network, the manhole including a substantially vertical housing embedded below a ground level, a fluid entrance opening in the vertical housing, a fluid exit opening in the vertical housing, and a round substantially horizontal access opening above the fluid entrance opening and the fluid exit opening, the round horizontal access opening including a diameter greater than 2 feet, the fluid monitoring system comprising:
a securing mechanism secured to the vertical housing near the horizontal access opening;
a vertically oriented spanning mechanism attached to the securing mechanism;
a flexible shaft attached to the vertically oriented spanning mechanism, a portion of the flexible shaft submerged in the fluid flow;
an accelerometer attached to the flexible shaft;
a pressure sensor proximate to the flexible shaft and structured for detecting a pressure;
a pressure tube connecting to the pressure sensor and contacting the fluid flow; and
a hydrophobic fluid inside the pressure tube.

17. The fluid monitoring system of claim 16 wherein the securing mechanism includes
an extendable and retractable mobile rod with a rod cap structure, in an extended position, to contact the vertical housing near the horizontal access opening, and a locking portion for maintaining the mobile rod in the extended position.

18. The fluid monitoring system of claim 17 further comprising:
a screw-type positioning mechanism in the mobile rod for adjusting the length of the mobile rod,
a pivot point in the mobile rod, and
a cushion connected to the rod cap.

19. The fluid monitoring system of claim 16 further comprising:
the securing mechanism being secured to the vertically oriented spanning mechanism by a clamping device operable by a rotatable knob.

20. A fluid monitor for monitoring and measuring the velocity of a fluid flow, the fluid monitor comprising:
an extendable and retractable expansion device securable to an access opening, the expansion device including
an extendable and retractable mobile shaft with a shaft cap adapted, in an extended position, to be secured proximate to the access opening, and
a locking portion for maintaining the mobile shaft in the extended position; and
a pole secured to the expansion device;
a flexible tube with an anchored end and a mobile end, the mobile end immersed in the fluid flow and moveable by the fluid flow, the anchored end being secured to the pole and being substantially less moveable by the fluid flow than the mobile end;
a data acquisition device disposed at least partially inside the flexible tube and proximate to the mobile end, the data acquisition device including
a pressure sensor structured for detecting a pressure and generating a pressure signal, and
a data storage device for receiving and storing the pressure signal;
a pressure tube extending from the pressure sensor in pressure communication with the fluid flow; and
a hydrophobic fluid within the pressure tube.

21. The fluid monitor of claim 20 with the mobile shaft further comprising:
a screw-type positioning mechanism in the mobile shaft for adjusting the length of the mobile shaft, and
the mobile shaft including a pivot point.

22. The fluid monitor of claim 20 further comprising:
a battery providing power to the data acquisition device; and
a wireless transmission component for transferring the stored pressure signal to a data reader.

23. The fluid monitor of claim 20 further comprising:
an accelerometer generating an acceleration signal in response to movement and/or orientation of the data acquisition device, and
the data storage device for receiving and storing the acceleration signal.

24. A method of using the fluid monitor of claim 20 comprising:
positioning the mobile end of the flexible tube in the fluid flow;
recording the pressure signal to the storage device before, during, and after a rain event; and
transferring the pressure signal from the storage device to a computer readable medium.

* * * * *